A. W. LIVINGSTON.
PACKAGING MACHINE.
APPLICATION FILED JULY 25, 1904.

1,059,942.

Patented Apr. 22, 1913.

15 SHEETS—SHEET 2.

Witnesses:
F. C. Fliedner

Inventor:
Andrew W. Livingston
By Geo. H. Strong
Atty.

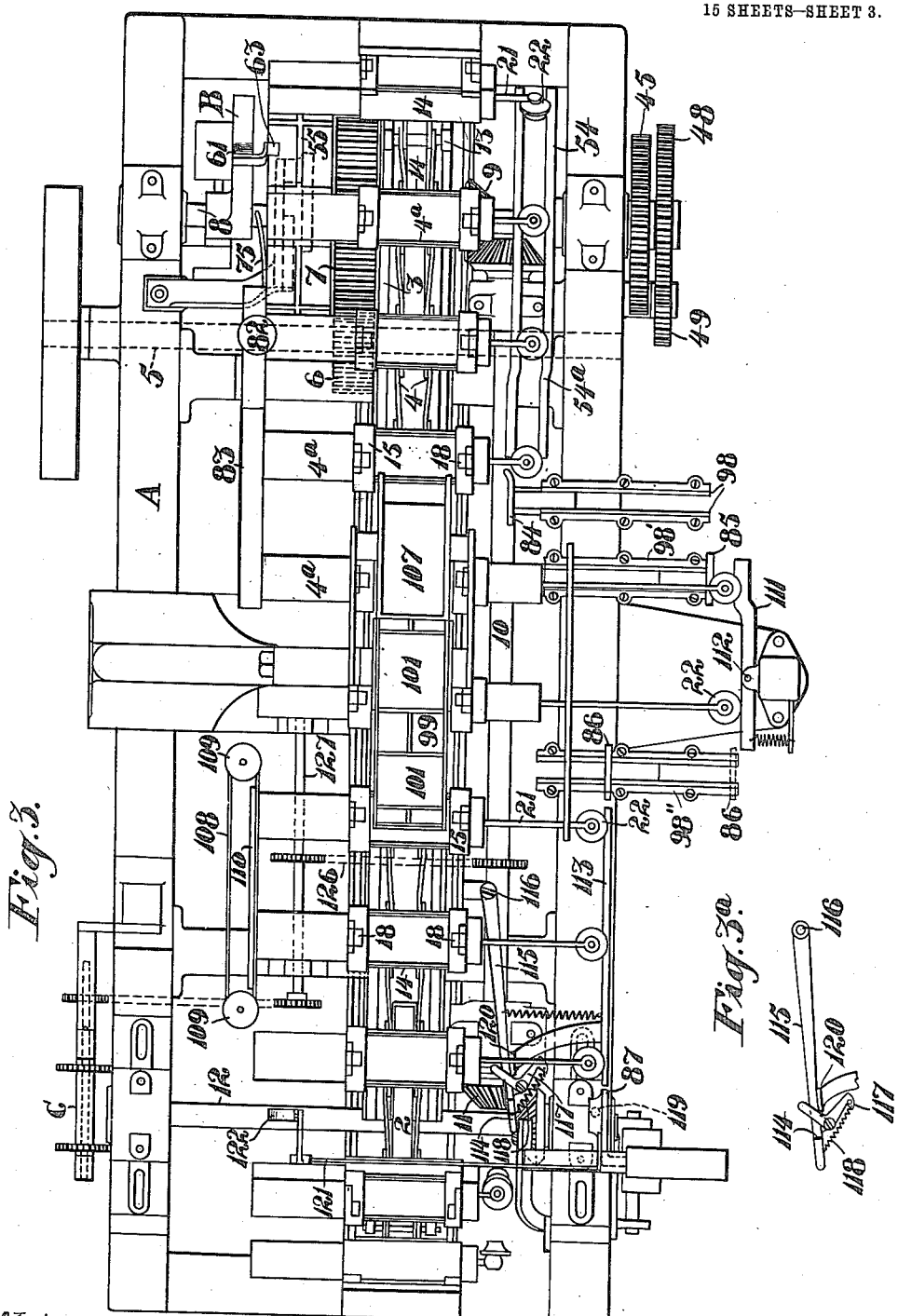

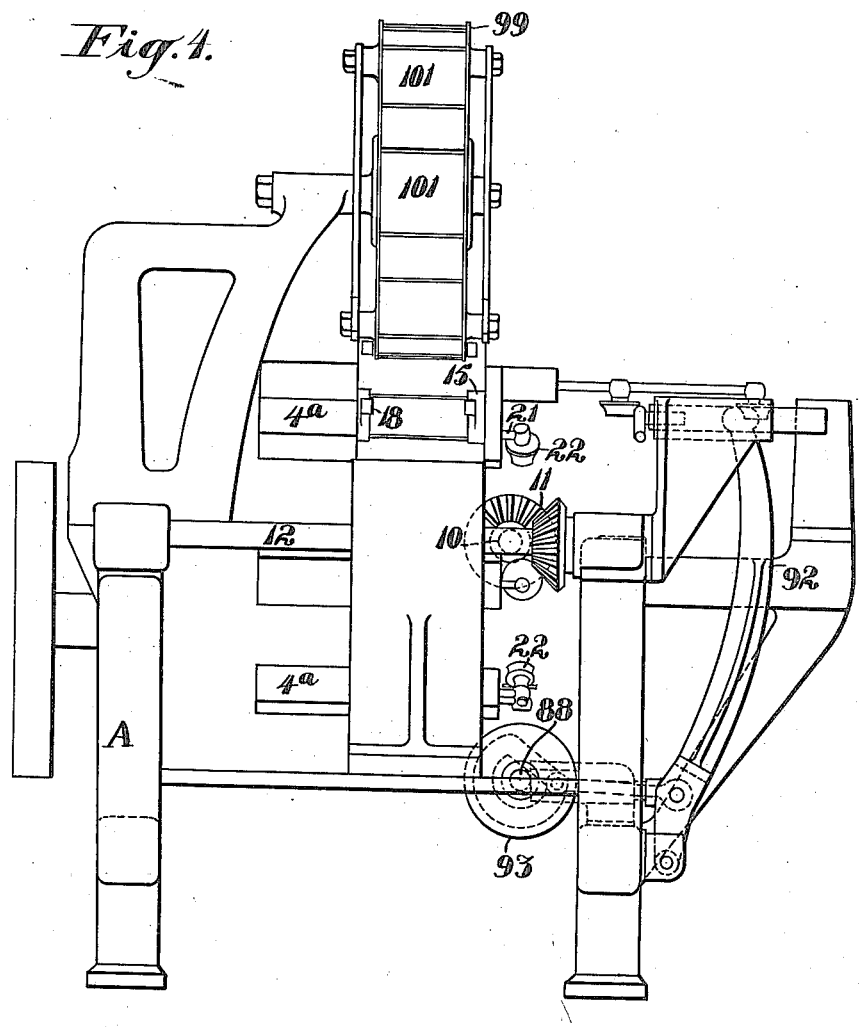

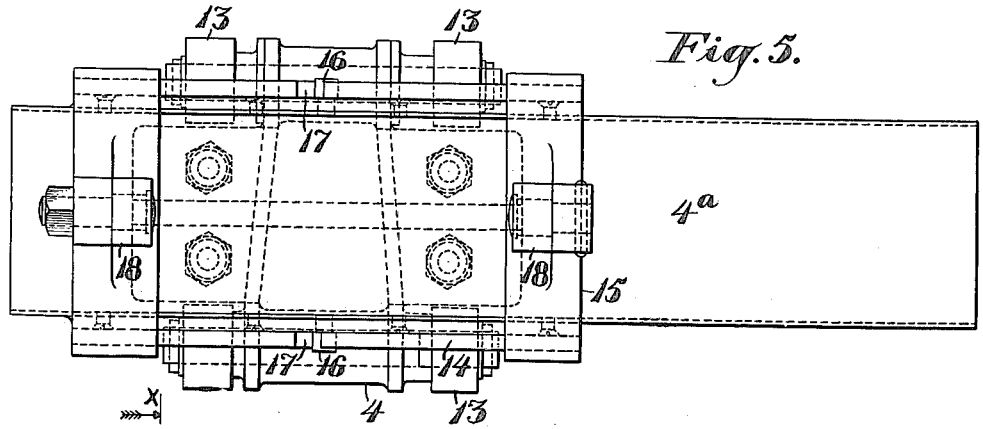
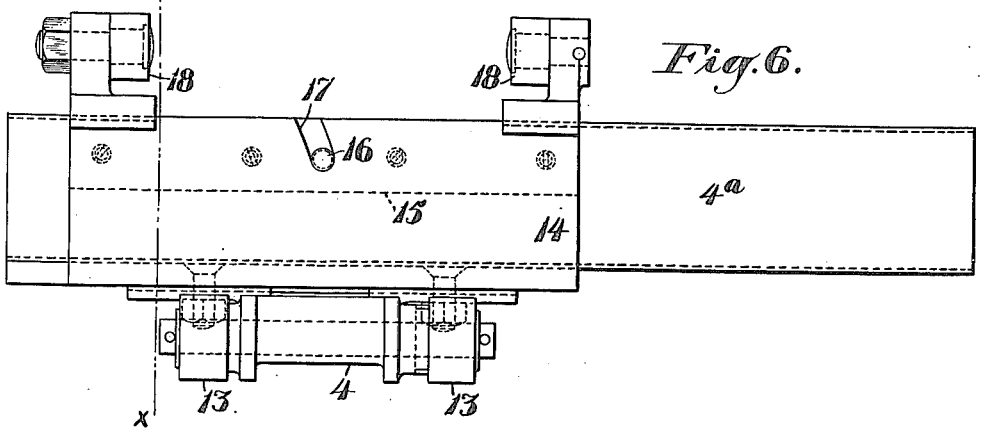
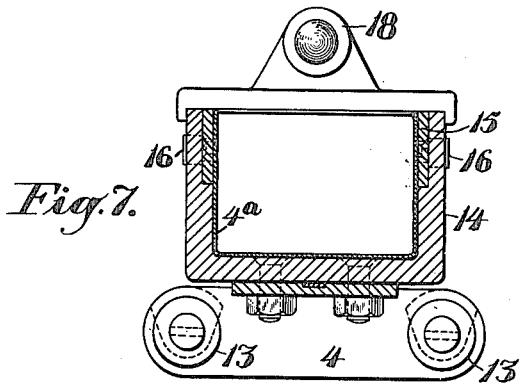

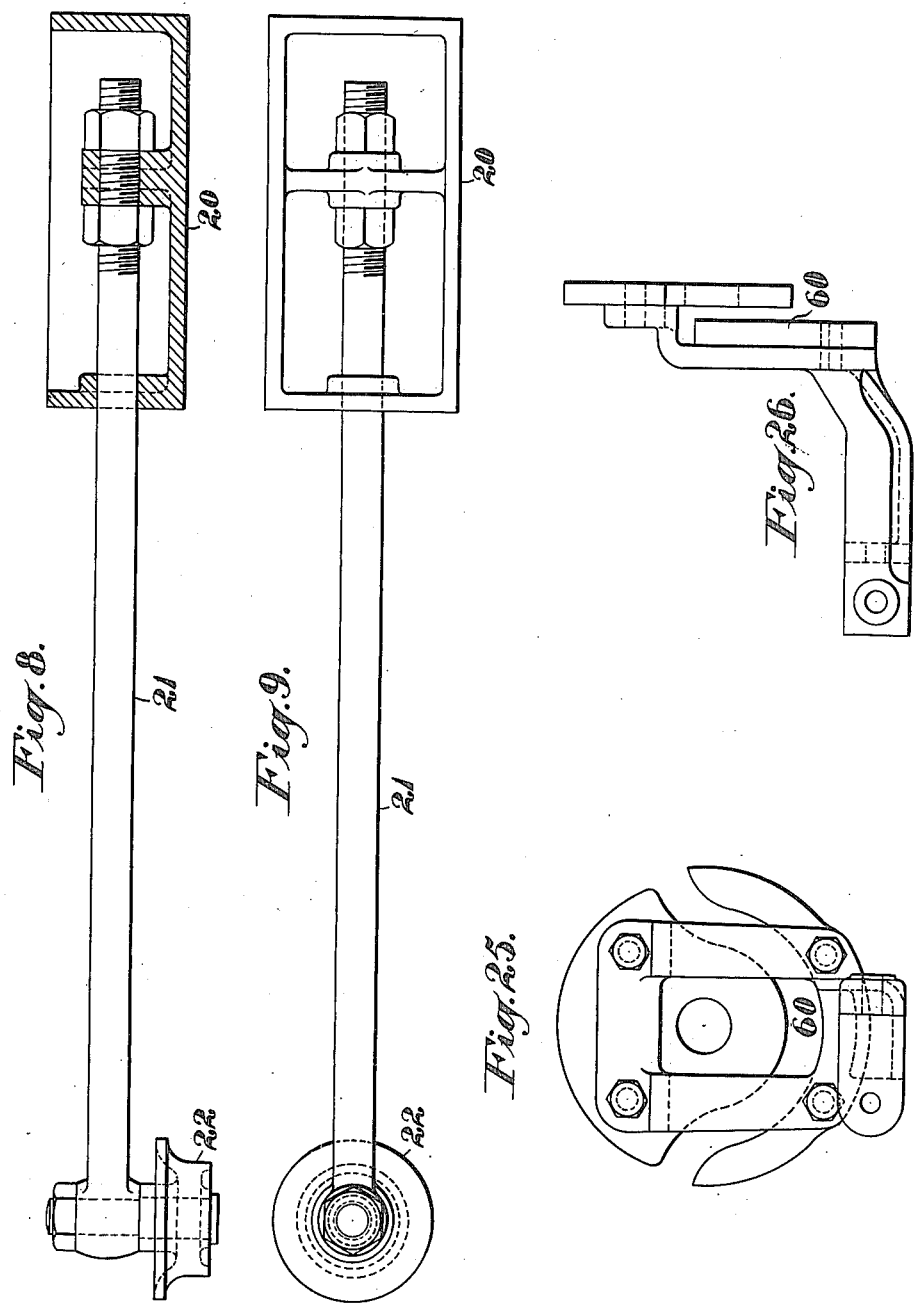

A. W. LIVINGSTON.
PACKAGING MACHINE.
APPLICATION FILED JULY 25, 1904.

1,059,942.

Patented Apr. 22, 1913.
15 SHEETS—SHEET 7.

Witnesses:
F. C. Fliedner

Inventor,
Andrew W. Livingston
By Geo. H. Strong.
Atty.

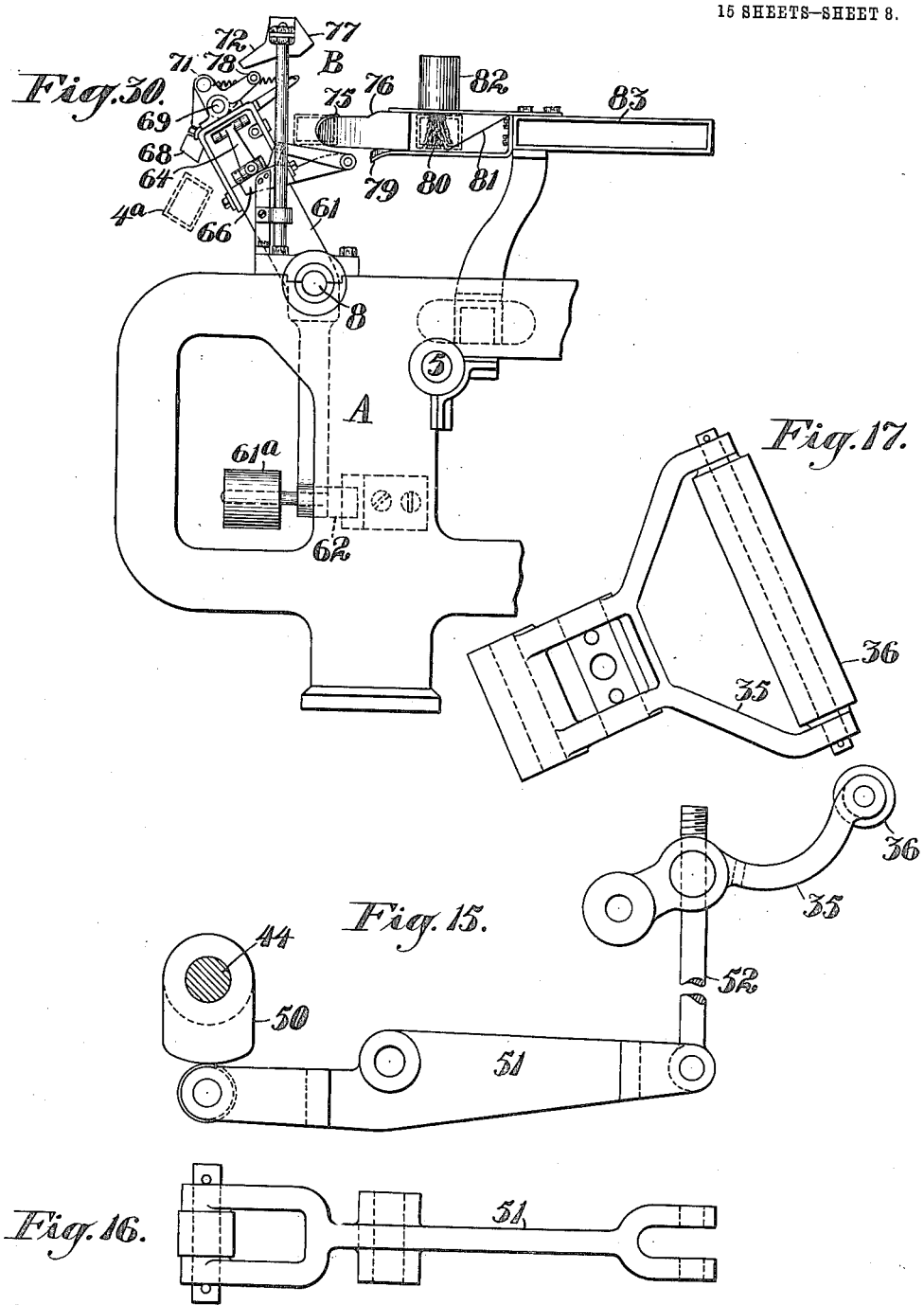

A. W. LIVINGSTON.
PACKAGING MACHINE.
APPLICATION FILED JULY 25, 1904.
1,059,942.
Patented Apr. 22, 1913.
15 SHEETS—SHEET 9.
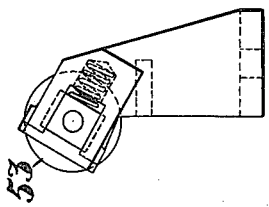
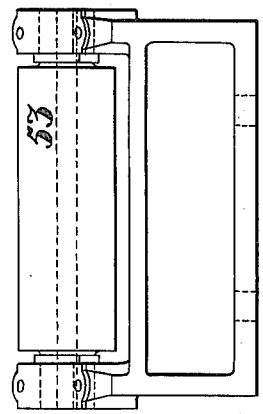
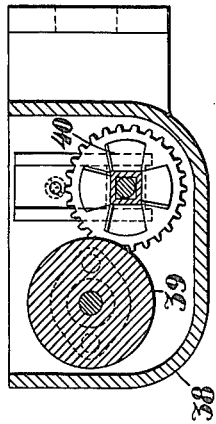
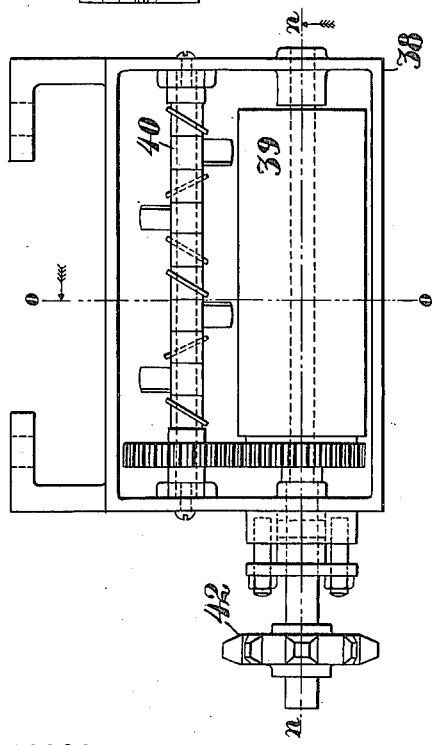
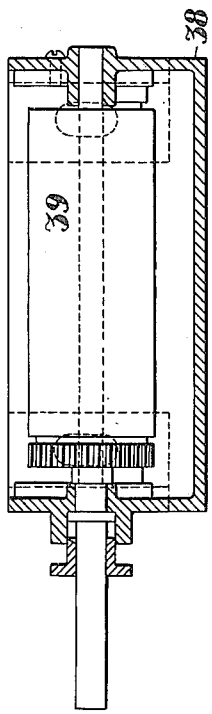

A. W. LIVINGSTON.
PACKAGING MACHINE.
APPLICATION FILED JULY 25, 1904.
1,059,942.
Patented Apr. 22, 1913.
15 SHEETS—SHEET 10.
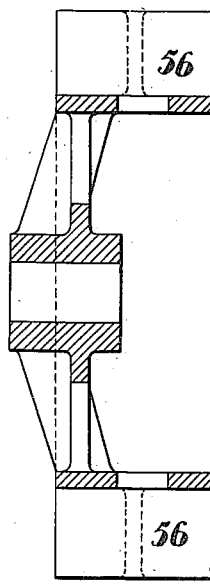
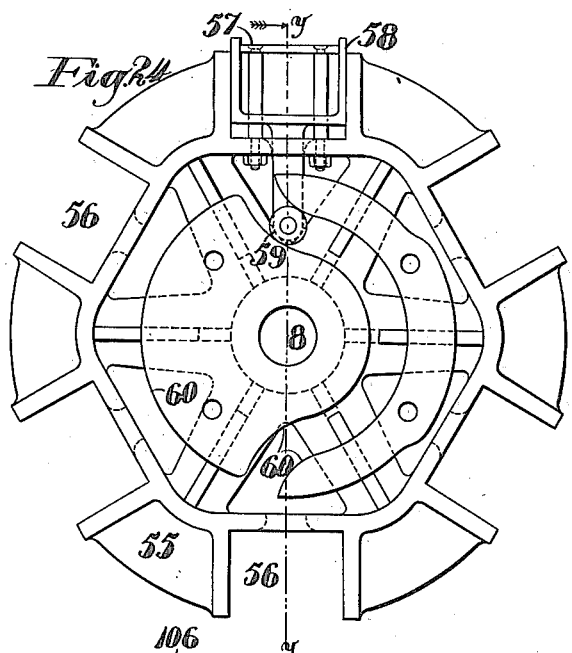
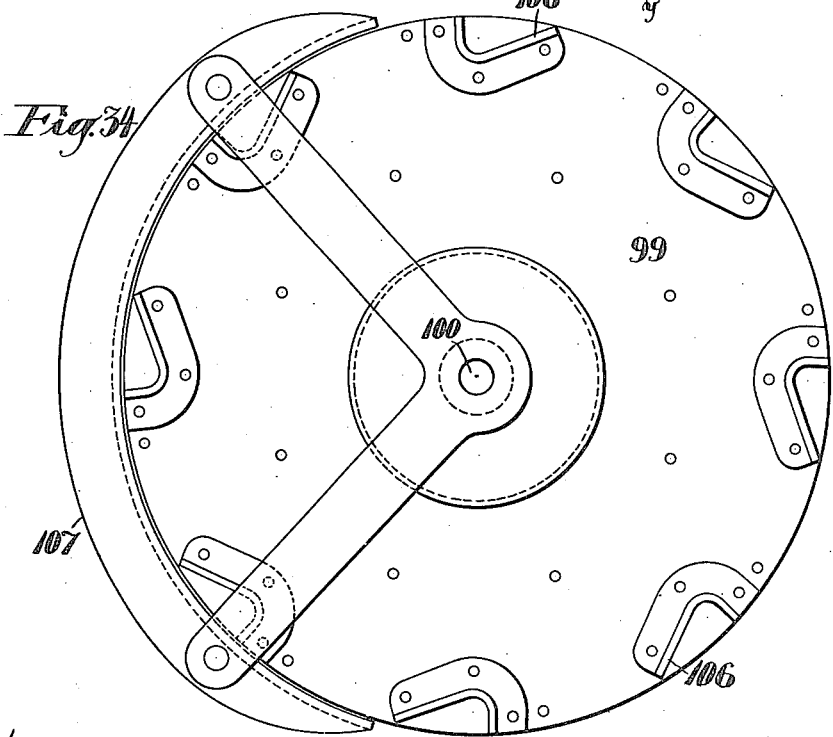
Witnesses:—
F. C. Fliedner
Inventor
Andrew W. Livingston
By Geo. H. Strong.
Atty.

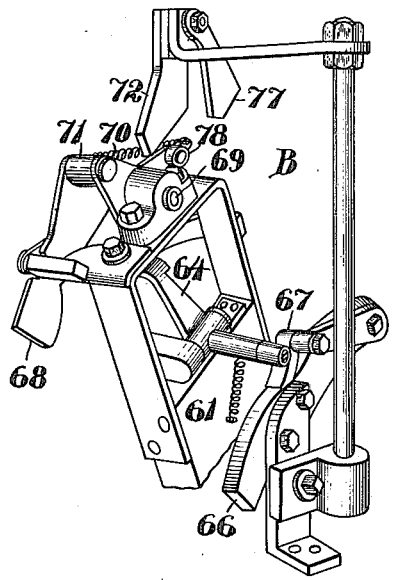
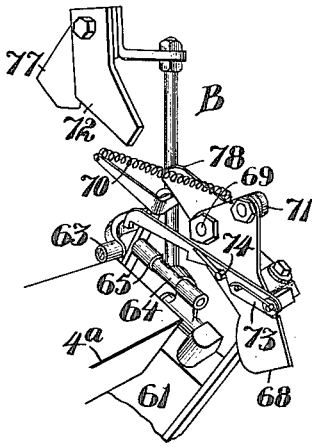
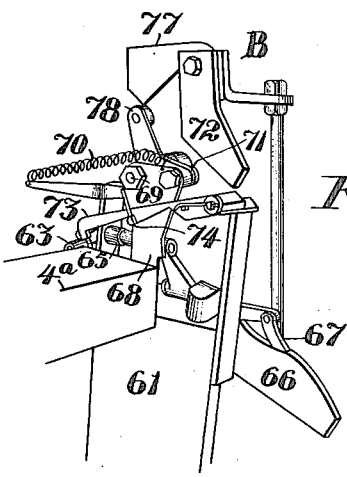

A. W. LIVINGSTON.
PACKAGING MACHINE.
APPLICATION FILED JULY 25, 1904.

1,059,942.

Patented Apr. 22, 1913.
15 SHEETS—SHEET 12.

Witnesses:—
F. C. Fliedner
J. H. Amrse

Inventor,
Andrew W. Livingston
By Geo. H. Strong
Atty.

A. W. LIVINGSTON.
PACKAGING MACHINE.
APPLICATION FILED JULY 25, 1904.
1,059,942.
Patented Apr. 22, 1913.
15 SHEETS—SHEET 13.
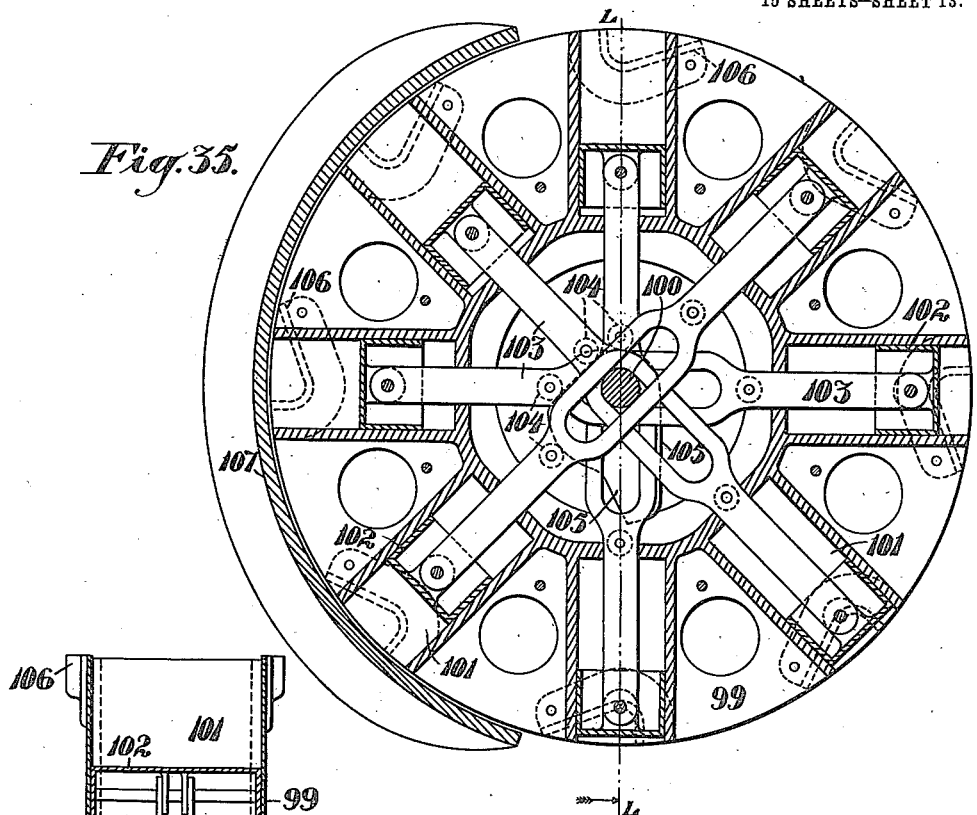
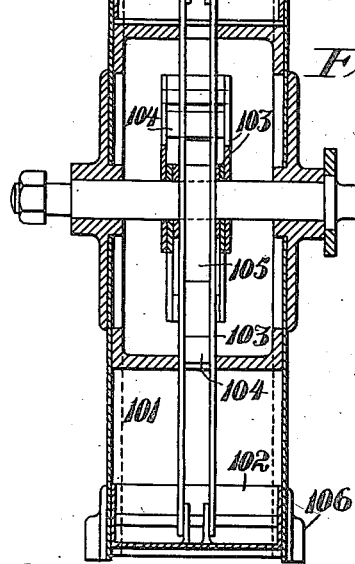
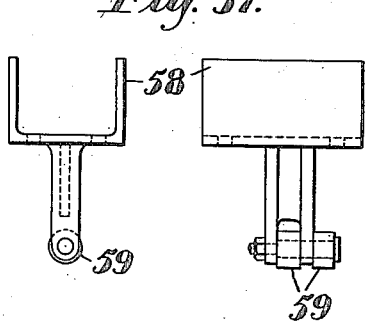
Witnesses:—
F. C. Fliedner
A. Somse
Inventor,
Andrew W. Livingston
By Geo. H. Strong
Atty.

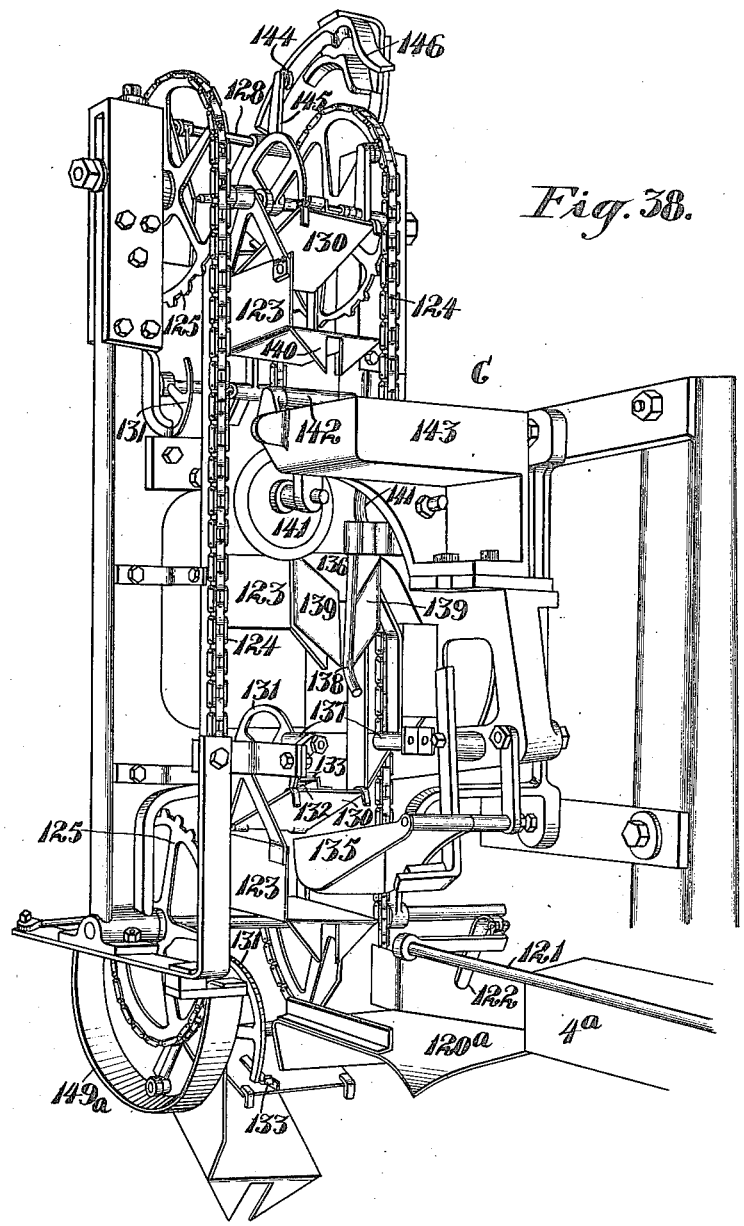

A. W. LIVINGSTON.
PACKAGING MACHINE.
APPLICATION FILED JULY 25, 1904.
1,059,942.
Patented Apr. 22, 1913.
15 SHEETS—SHEET 15.
Fig. 39.
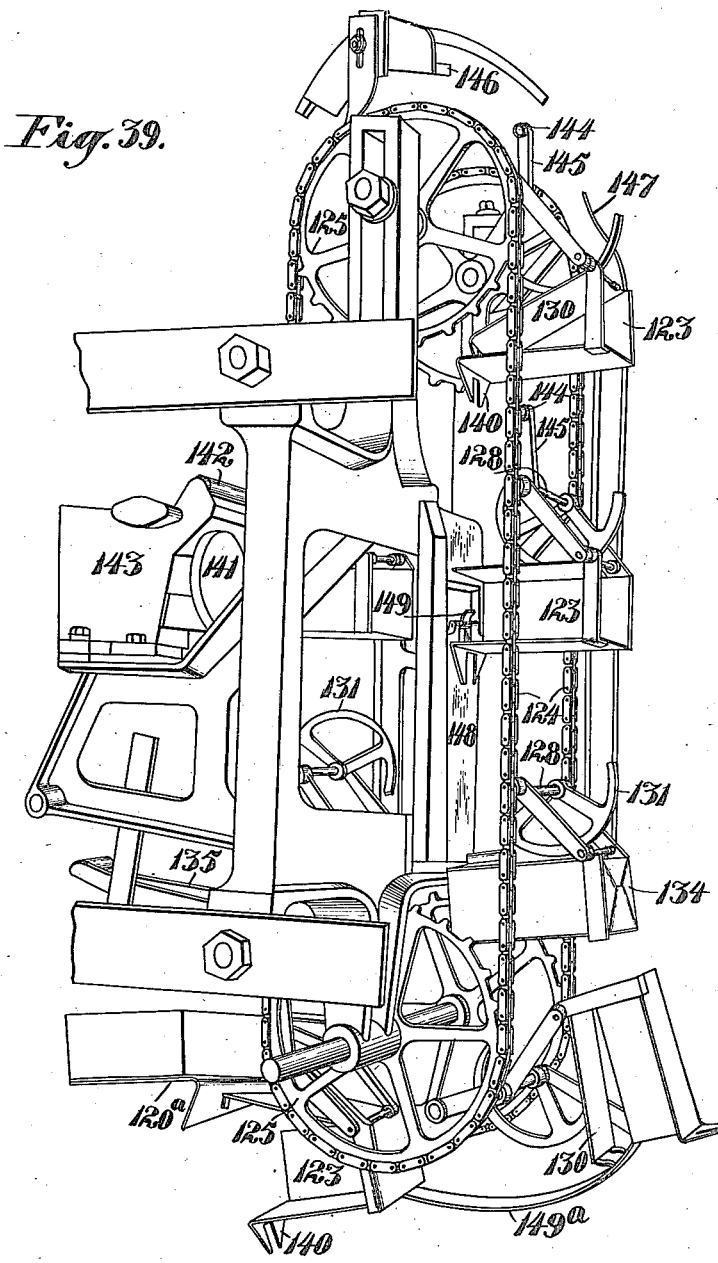
Fig. 39<sup>a</sup>.
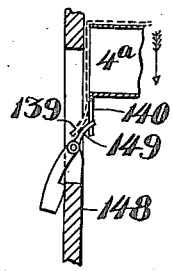
Witnesses:—
F. C. Fliedner
G. A. Amase
Inventor,
Andrew W. Livingston
By Geo. H. Strong.
Atty.

UNITED STATES PATENT OFFICE.

ANDREW W. LIVINGSTON, OF ALAMEDA, CALIFORNIA.

PACKAGING-MACHINE.

1,059,942. Specification of Letters Patent. Patented Apr. 22, 1913.

Application filed July 25, 1904. Serial No. 218,022.

*To all whom it may concern:*

Be it known that I, ANDREW W. LIVINGSTON, a citizen of the United States, residing at Alameda, in the county of Alameda and State of California, have invented new and useful Improvements in Packaging-Machines, of which the following is a specification.

My invention relates to packaging machines and particularly to machines for putting up dried fruits and like coarse and more or less adhesive and sticky substances, into packages of uniform size and weight ready for shipment. Its object is to provide a practical machine of this character whereby the blank sheets are taken, folded and sealed to form the wrapper, the fruit put in and the end of the package sealed; and which machine shall have a large capacity and be automatic and continuous in operation, requiring no manual labor except the care of the machine and the supply of the required material to the machine.

It consists of the parts and the construction and combination of parts as hereinafter more fully described and claimed, having reference to the accompanying drawings, in which—

Figure 1:
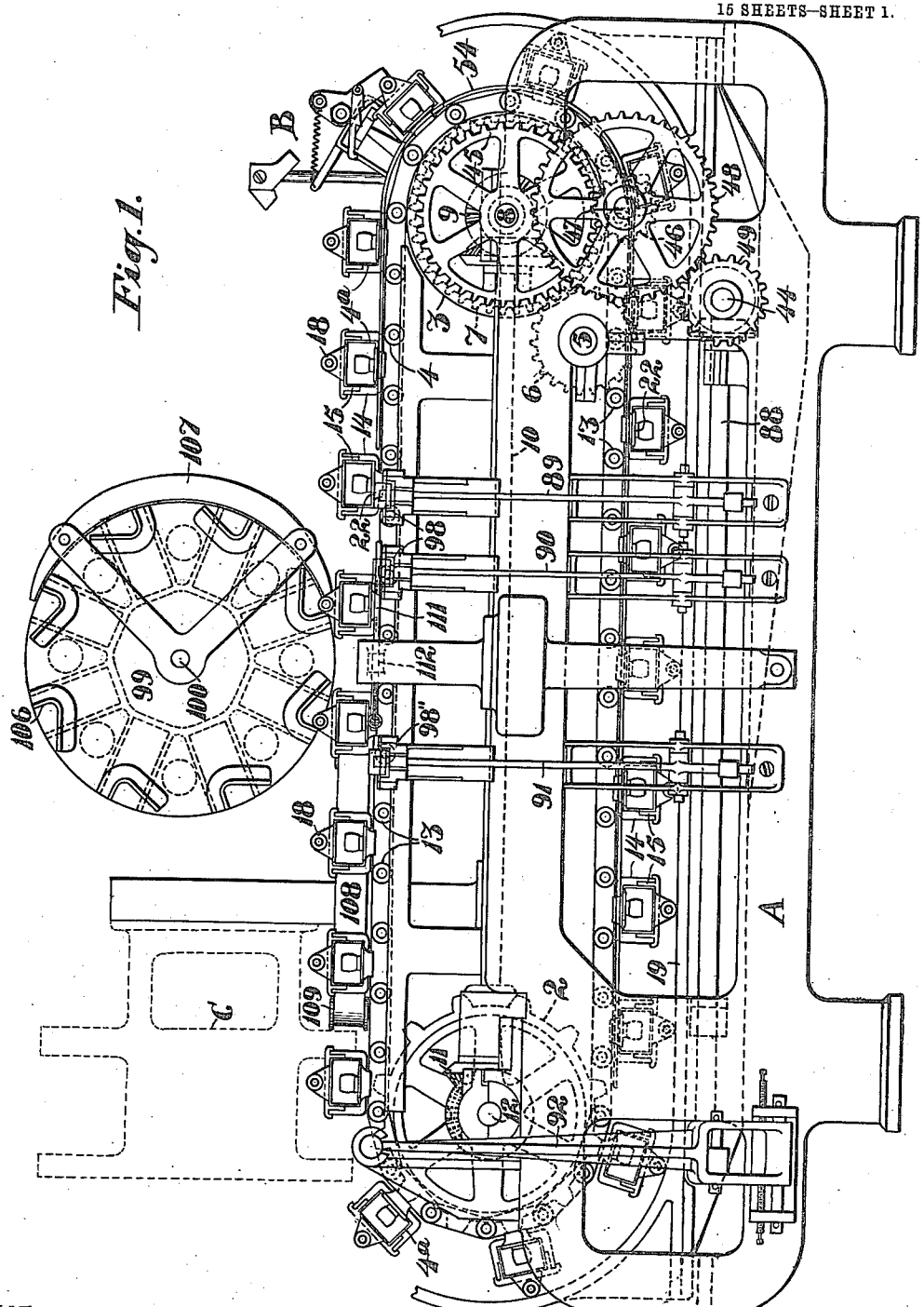
Figure 2:
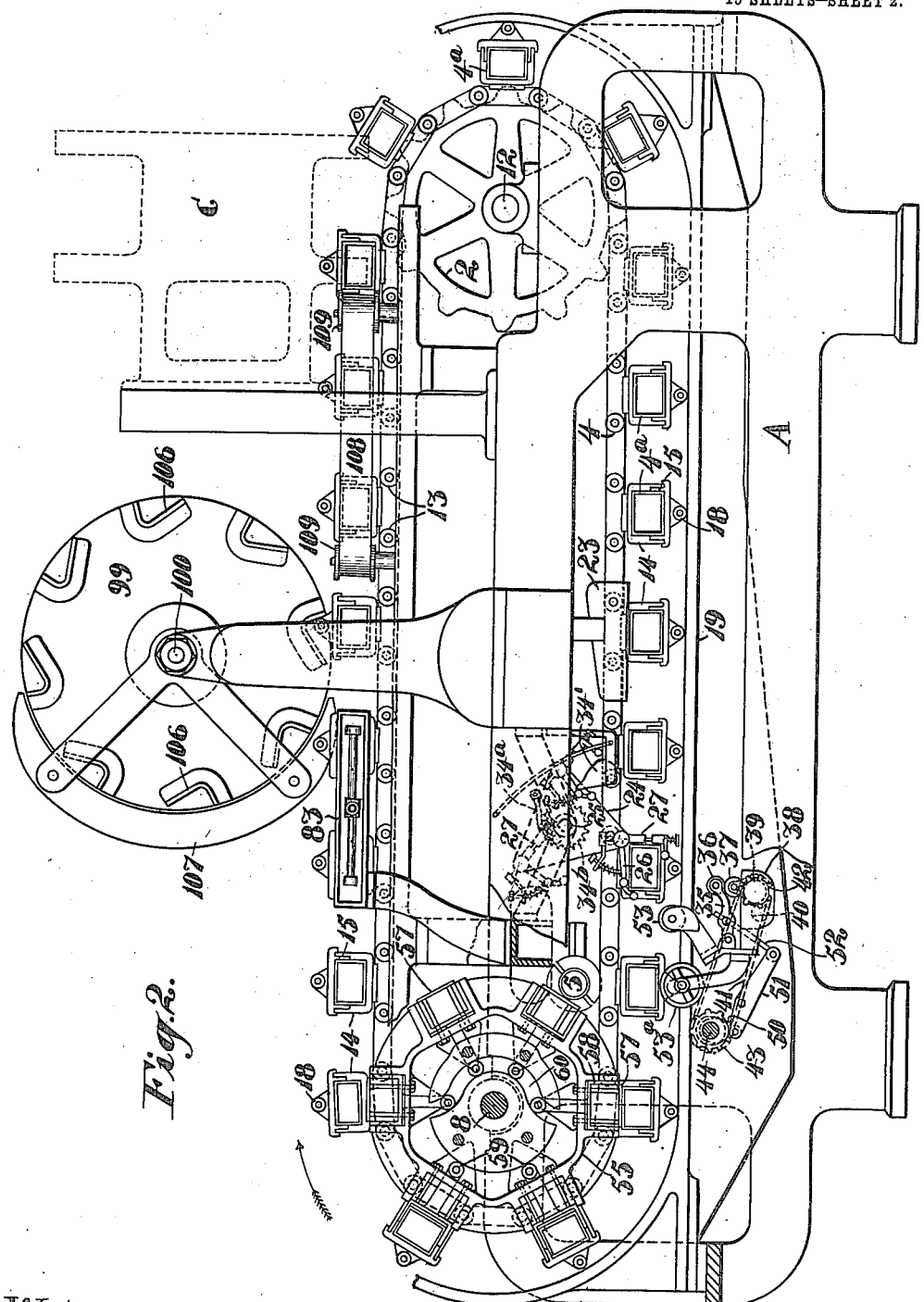
Figure 40:
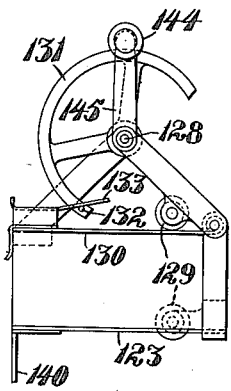
Figures 10, 11, 41:
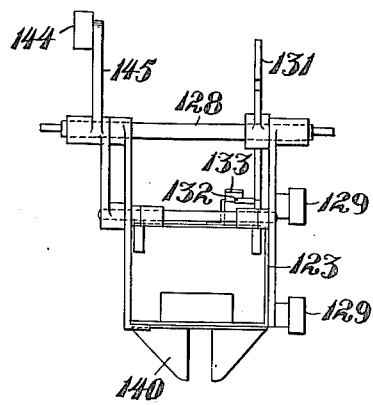
Figure 12:
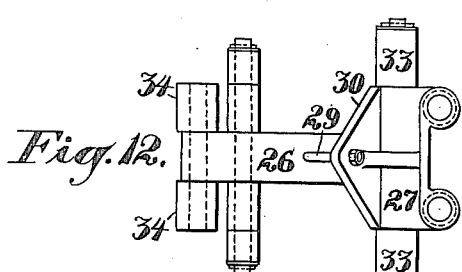
Figure 14:
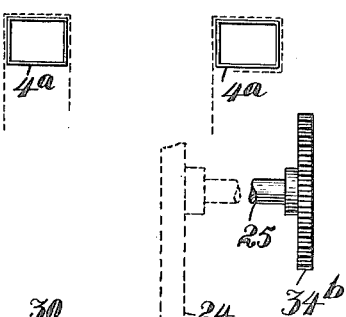
Figure 13:
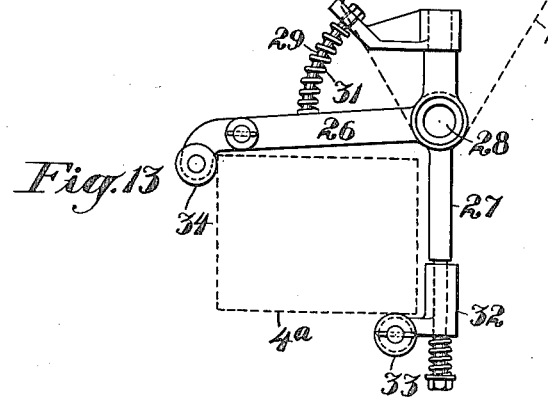
Figure 31:
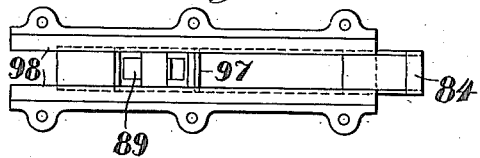
Figure 32:
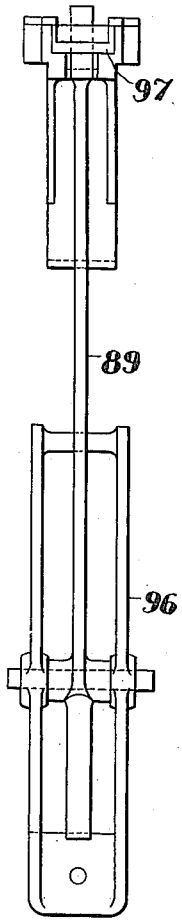
Figure 33:
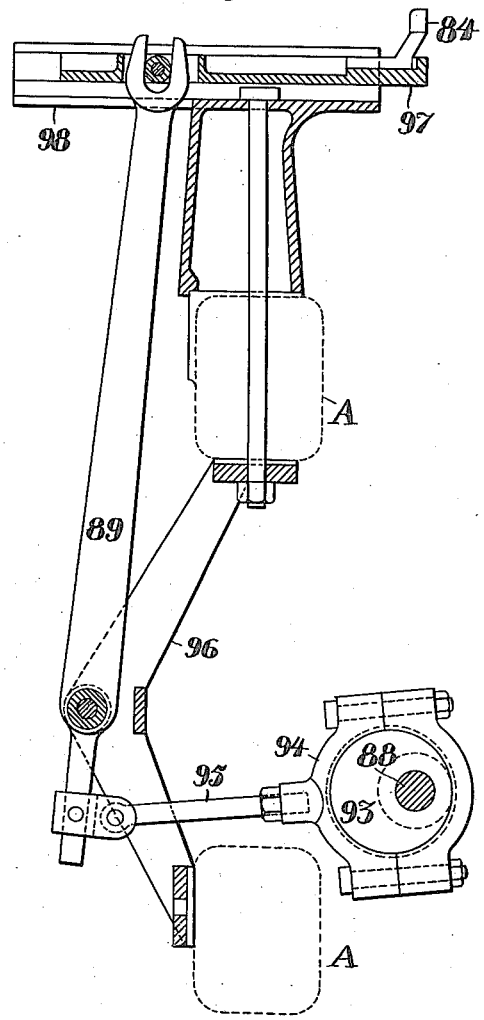

Figure 1 is a side elevation of my apparatus omitting certain parts. Fig. 2 is an elevation from the opposite side omitting certain parts. Fig. 3 is a plan view of the machine. Fig. 3ª is a detail of the stop mechanism for plunger rod for moving the filled wrappers to the final end-folder. Fig. 4 is a rear end view of the machine, certain parts being omitted. Fig. 5 is a plan view of one of the formers and link carrier. Fig. 6 is a side view of same. Fig. 7 is a section on line x—x of Fig. 6. Fig. 8 is a side view of a plunger with part in section. Fig. 9 is a plan view of same. Figs. 10 and 11 show paper folded around a former. Fig. 12 is a plan view of a grip mechanism. Fig. 13 is a side view of same. Fig. 14 is an edge view of same. Fig. 15 is a front view of a lever and means to lift gluing roller. Fig. 16 is a plan view of same. Fig. 17 is a plan view of the gluing roller. Fig. 18 is a plan view of a receptacle to contain glue or paste. Fig. 19 is a section on line N—N of Fig. 18. Fig. 20 is a section on line O—O of Fig. 18. Fig. 21 is a side view of a stationary roller to compress the edges of paper. Fig. 22 is an edge view of same. Fig. 23 is a section on line y—y of Fig. 24. Fig. 24 is a front view of a drum to keep pasted parts from separating. Figs. 25 and 26 are detail of a cam to operate holders in the drum. Fig. 27 is a perspective view of a folding mechanism. Fig. 28 is a perspective view of same showing opposite side. Fig. 29 is a perspective view of same showing movable position of plate or blade. Fig. 30 is a side view of a part of my apparatus not shown in Fig. 2. Fig. 31 is a plan view of carrier guide to operate plungers. Fig. 32 is an end view of same. Fig. 33 is a side view of same with part in section. Fig. 34 is a side view of the feed wheel. Fig. 35 is a transverse section of same. Fig. 36 is a section on line L—L of Fig. 35. Fig. 37 is a detail of a holder operating in drum. Fig. 38 is a perspective view of the mechanism to seal up packages. Fig. 39 is a perspective view of same showing opposite side. Fig. 39ª is a section showing finger on rubber plate. Figs. 40 and 41 are details of a holder operated by sealing mechanism of Figs. 38 and 39.

A represents a suitable frame-work supporting the operating parts of my apparatus.

At the rear end per Fig. 2 of the frame is mounted a sprocket wheel 2, and at the forward end a drum 3, around which passes the driving chain 4 carrying the hollow formers 4ª offset to one side of the chain as shown for instance in Figs. 3—4.

Referring to Figs. 1—2—3—4, power is transmitted to the rear sprocket wheel to move the formers continuously from the main drive shaft 5 through the medium of the gear 6, the intermeshing gear 7 on the shaft 8 of the forward sprocket, and thence through bevel gearing 9 to horizontal shaft 10 and bevel gearing 11 on shaft 12 of the rear sprocket.

Carrier 4 consists of a series of conjoined links Figs. 5, 6 and 7 provided with the rollers 13 which run on suitable rigid tracks on the frame intermediate sprocket 2 and drum 3. Each link carries a casting or box 14 open on top and at both ends and in which a former 4ª is removably held. The formers are open-ended hollow cylinders of shape and size to suit the package required and have a portion adjacent to one end open on top and suitably reinforced as at 15. They are adapted to be slipped into the boxes 14 and to have the tubular part about which the wrapper is to be folded project out through and beyond an end of the boxes. The reinforcements 15 carry lugs 16 engaging the inclined slots 17 in the boxes whereby the formers are held against end shift and at the same time are permitted a limited oscillating movement about the lugs to allow the formers to adjust themselves to the various pressures to which they are subjected in their transit. The reinforces 15 carry at each end the rollers 18 which run on the guide tracks 19 to prevent the formers falling out of the boxes in passing around the sprockets and along their lower plane of travel. By removing a section of track 19, any of the formers may be quickly taken out of or replaced in boxes 14. The formers are each provided with a plunger 20 (Figs. 8 and 9) which is reciprocal across the opening in the top of the former to compress the fruit and to expel the fruit and envelop from the former as to be described hereinafter. The plungers have each a stem 21 carrying a roller 22 running in suitable guides in the frame to hold the plunger in proper position at various stages in its transit, and the nature of these guides and the means for reciprocating the plungers will also be described later.

It is assumed for convenience that the drum 3 is at the head of the machine and that the carrier 4 travels from beneath around this drum in the direction of the arrow Fig. 2.

The sheets of paper from which the wrappers are formed are fed successively and singly to the formers by any suitable means at a point underneath the machine as indicated by the guard plate 23 Fig. 2. The sheets which are first printed or otherwise embellished with such advertising matter as may be borne by the finished package, are folded as shown in dotted lines Fig. 10 previously to being placed on the former, so that each sheet may rest on top of a former with two parts hanging down on each side of and beneath the former, and a portion projecting past the end of the former sufficient to be folded over and form the end of the package. Being thus folded about three sides of and overhanging the end of the former, the pendent edges of the sheet are folded up against the underside of the former pasted and dried by the following means: Having reference to Figs. 2, 12, 13 and 14. 24 is a rotatable support mounted fast on a shaft 25 and carrying grip mechanisms pendent in the path of the formers and adapted to engage the former on four sides and grip the sheet. These grip mechanisms each consist of two coöperating arms 26—27 pivoted radially of support 24 as at 28 and standing approximately at right angles to each other and having each a limited oscillating movement relative to one another. The horizontal arm 26 has a curved pin 29 disposed in an arc whose center is the center of pin 28 and is slidable in a bracket 30 on vertical arm 27. The end of pin 29 is headed and a spring 31 tends to press the two arms together. The upper horizontal arm 26 is approximately of the same length as the width of the former, while arm 27 is approximately equal to the narrower dimension of the former. The arm 27 has an adjustable extensible spring-pressed part 32 and the latter and the end of arm 26 carry on inwardly extended portions the respective rollers 33—34. The grippers are hung radially of the support 24 and are so spaced and the grip members are so balanced and so guided in the revolution of the support by means as 34' that each former as it comes along with a sheet in position will contact with rollers 33—34: one on the rear vertical side of the former, the other hooking over the upper front corner of the former as shown in Fig. 13. The support 24 is held against turning backward by a pawl 34ª and a pinion 34ᵇ.

As a former passes under the support 24 the arms 26—27 are separated and the rear roller 33 is crowded down until it engages underneath the former as shown in the same figure. This leaves the sheet with the front edge hanging straight and the rear edge folded up against the bottom of the former, as shown in dotted lines Fig. 11. Subsequent to the gripping thus of the sheet about the four sides of the former an arm 35 Figs. 2, 15 and 17 carrying a paste roller 36 and having a movement relatively faster than the carrier 4, is thrown up from behind to deposit a line of paste along the lower inner edge of the pendent side of the sheet. Roller 36 normally rests on the distributing roller 37 (Fig. 2) which is suitably journaled in a receptacle 38 containing adhesive as glue or paste. This paste-box contains a second distributing roller 39 and an agitator 40. Figs. 18, 19, 20. Roller 36 normally rests by gravity on roller 39 and the latter and its agitator 40 are driven constantly through the medium of a chain 41, Fig. 2, passing around a sprocket 42 on the shaft of roller 39 and a sprocket 43 on shaft 44 journaled in frame A. Shaft 44 (Fig. 1) is driven from shaft 8 by means of a gear 45 on the latter engaging a gear 46 on a countershaft 47 which carries also a large gear 48 engaging a gear 49 on shaft 44. The arm 35 carrying the gluing roller 36 is pivoted to a fixed part of the frame and is lifted periodically by means of a cam 50 (Figs. 2 and 15) on shaft 44 engaging a lever 51 fulcrumed intermediate of its ends and connecting with arm 35 by an adjustable link 52.

Immediately after roller 36 has applied paste to the edge of the sheet carried by the former cylinder a roller 53 is encountered which folds up this pasted edge against the already folded complementary edge of the sheet and a succeeding heating roller 53ª irons the seam and the heat of the roller dries the paste as the former passes over it. Thus the sheet is folded completely about the four sides of the former and pasted.

The next step is that of folding the end of the sheet over the end of the former. This is done by mechanism indicated collectively by B Figs. 1 and 3 and shown in detail in Figs. 27, 28 and 29. During this folding operation the plungers 20 are intruded into the formers to bring their ends flush with the outside edges of the formers to give a solid support for the end folding and ironing of the sheet. This intrusion of the plungers is effected by the parallel guides 54 Fig. 3 between which the rollers 22 run. As the formers with their sheets folded and pasted along their longer edges pass around the front of the machine suitable means is provided to keep the pasted parts from separating in case the paste may not have fully dried. I have here shown a drum 55 coaxial and turnable with drum 3 and having a plurality of peripheral pockets 56 correspondingly spaced with the spaces between the formers. These pockets are bridged over each by a fixed plate as 57 which offers a support for the under side of the formers and for the folded sheets in their passage around the front end of the machine. A space is left between the edges of the plates 57 and the walls of their respective pockets for the operation of the holders 58 which reciprocate in the several pockets. These holders consist each of a more or less U shape member whose arms are adapted by reason of the engagement of a roller 59 on a stem on the holder with a cam groove 60 to be obtruded to embrace the two sides of a former as it comes squarely upon a plate 57 and to be retracted before the former leaves a plate.

The end folding mechanism previously referred to collectively as B is as follows, having reference particularly to Figs. 27, 28, 29 and 30: 61 is an arm fulcrumed on shaft 8 and weighted as at 61ª and having an arc of movement essentially parallel to that described by the formers during a portion of their travel. This arm normally tilts forward at an angle of approximately 60° from the horizontal, its downward movement being limited by a rubber buffer 62. As a former comes along its upper front edge engages a roller 63 carried by an arm fulcrumed on arm 61. This causes the arm 61 with its associated folding mechanism to move in unison with the former. A bell crank lever 64, fulcrumed on arm 61, with its pivot at right angles to the length of arm 61 and parallel with the plane of movement of arm 61, carries a roller 65 at one end by which the top edge of the projecting sheet is folded down over the end of the former. The radial movement of roller 65 is effected by the opposite roller-bearing end of lever 64 which normally runs on a segmental guide 66, encountering an abruptly inclined hinged guide 67 fulcrumed in the path of the end of the lever and continuous in one direction with guide 66. The contact with this hinged guide 67 tips up the outer end of lever 64 and consequently gives the roller 65 a rapid downward radial movement to fold the upper edge of the sheet. As soon as the lever rides over guide 67 it drops back again on to guide 66 causing the lifting and retraction of the folding roller 65 out of the way of the side-folding mechanism which must next operate. 68 is a plate or blade fixed to a rock shaft 69 fulcrumed on the end of arm 61. This plate has a limited movement across the front side edge of the former to turn in that edge of the sheet. It is normally retracted out of interference with the formers by means of a spring 70. The oscillation of plate 68 to fold the sheet is effected by the engagement of a part 71 rigid with and eccentric to shaft 69, with a hinged stop 72. As the plate is brought into vertical position over a portion of the end of the former sufficiently to fold the front edge of the sheet, a notched keeper 73 pivoted on arm 61 engages a pin 74 on the blade to hold it against the tension of spring 70. An end of keeper 73 rests on roller 63 when in position shown in Fig. 29 so that when this roller is lifted from engagement with the former, the keeper is tilted to free plate 68 and allow spring 70 to act. The length of plate 68 is such as to cause the plate in its movement to crease the side end fold of the paper close to the bottom edge of the former so that in the subsequent up-folding of the bottom edge of the sheet a smooth close fold will result. As a former approaches its upper horizontal plane of movement, still engaging roller 63 to carry arm 61 with it, the front edge of the sheet on the former engages an outwardly curved stationary guide 75 (Fig. 30) which gradually folds in that edge of the sheet toward the part already folded by plate 68. With both side edges of the end of the sheet safe within guide 75, the roller 63 runs upon an upwardly inclined part 76, lifting keeper 73 to free plate 68 and disengaging the roller from the former and allowing the arm 61 to fall by gravity back to its original position where the succeeding former engages the roller 63 and the same operation is repeated. By interposing the hinged guide 67, the arm 64 rides freely under it on the return of arm 61 so that roller 65 will not be obtruded to hit or interfere with any of the other parts of the machine. As arm 61 partakes, during its uplift, of the same movement as the former, the roller 65 and plate 68 are enabled to operate to perform their several functions in the desired manner.

To insure the return of plate 68 to the position shown in Fig. 28 entirely out of the path of the projecting wrapper ends on approaching formers, even in case spring 70 should break, I employ a hinged stop 77 free to swing toward the rear of the machine, but arranged to engage an arm 78 rigid with plate 68 on the return movement of arm 61.

The former with three edges of the end of the sheet folded in, carries the lower horizontal edge of the sheet successively upon a curved horizontal guide plate 79, Fig. 30, beneath a paste brush 80 and upon an inclined guide 81 disposed in a vertical plane, which complete the end closure of the package. The brush 80 is fed with adhesive from the pot 82 and is adapted to apply just a small quantity of paste to the edge of the paper. The folded end of the sheet is then carried by the further movement of the former against a hot ironing plate 83 by which the paste is thoroughly dried. During all this end folding process the plungers 20 have had their ends held in approximately the same plane with the ends of the formers so that a solid support to fold against has been afforded. During the moment that the end of the former is passing the ironing plate 83, the plunger is given an extra inward push by means of the inset in guides 54 indicated at 54ª to press the end of the wrapper snug against the ironer.

With the wrapper now folded and sealed on the four sides and one end, it is ready to receive its charge of material. It is first necessary however to retract the plungers and as it is to be remembered that the machine is a continuous movement machine, the reciprocation of the plungers either to retract them to allow the formers and wrappers to be filled, or to be pushed in to compress the fruit and finally to expel the fruit and wrapper, must be done while the carrier 4 and formers are in motion. The reciprocation of the plungers is accomplished by a series of transversely reciprocating successively operating carrier guide sections or carrier guides, as they may be termed designated as 84—85—86—87. Fig. 3. As shown in Fig. 1 shaft 44 has a bevel gear engaging a corresponding gear on a line shaft 88 extending lengthwise of the machine. This shaft 88 carries a series of eccentrics from which an oscillating movement is transmitted to the levers 89—90—91—92 which respectively operate the carrier guide sections 84—85—86—87. A description of the means for operating one of these guide sections from shaft 88 will suffice for all of them. Having reference more particularly to Figs. 31, 32 and 33. 93 represents an eccentric as above mentioned on shaft 88. A collar 94 surrounds this eccentric and carries a link 95 connecting with lever 89 which is fulcrumed to a bracket 96 on frame A. The upper end of the lever connects with a carriage 97 slidable in guides 98 on the frame, and carrying the guide section 84. The movements of the several carrier guides 84—85—86—87 are coördinated so that they take hold at the proper times to move the plungers out or in as required. The outward movement of the plungers is effected by carriers 84—85. Compression of the fruit is done by carrier 86, and expulsion of the fruit and wrappers from the formers is done by the carrier 87. Two carriers 84—85 are used to retract the plungers because the limits of the machine require retraction to take place while the carrier 4 is moving only a very short space; since the movements of carrier 4 is at right angles to the direction of movement of the carrier guide sections and as the carriers 84—85 are close together, the carrier 85 simply takes up and completes the work begun by carrier 84.

On its most inward movement toward carrier 4, the section 84 moves across the path of an approaching roller 22 so that as a roller 22 comes from out the guides 54ª, it will pass outside of section 84. The movement of the latter is so timed that at the right moment it will move outward carrying section roller 22 and the plunger with it. Meanwhile the next section 85 has been moved in to a point corresponding to the distance section 84 will reach while roller 22 is moving over it. From section 84 the roller passes on to section 85 and is moved clear out to the position shown in Fig. 3.

With the wrapper sheet folded as before described and the plungers retracted the formers are ready to receive a charge of material to be packaged. Any suitable means may be employed to deliver a predetermined measured quantity of material into the opening above a box 14 in advance of the plunger. I have here shown a convenient form of feed mechanism which is adapted to receive from the weighing mechanism one pound or other predetermined quantity of material, as for instance, dried prunes, partially compress these prunes into a brick substantially of the shape of the finished package and to discharge this brick into the formers.

99 represents a feed wheel suitably mounted in relation to carrier 4, on a stationary horizontal shaft 100, see more particularly Figs. 34, 35 and 36. This feed wheel is provided with peripheral radial pockets 101 alined in pairs; plungers 102 connected in pairs by longitudinally slotted rods 103 reciprocate in these pockets. The rods 103 carry each a roller 104 running upon the periphery of a stationary cam 105. The pockets are open at their outer ends and the plungers form movable bottoms for the pockets. The shaft 100 extends through the slots in the rods 103 and serves as guide and support for the rods. The reciprocation of rods and plungers is effected by the rollers 104 and the irregular stationary cam 105 so that when an empty pocket is at the top of the wheel ready to receive a charge its plunger is retracted while the diametrically opposed pocket is discharging into a former and its plunger is moved out nearly or quite to the periphery of the wheel as shown in Fig. 35. The wheel is turned step by step by the engagement of the rollers 18 on carrier 4 with the stops 106 on the wheel so that at each actuation a pocket is brought directly over the opening in a former in inverted position. When a pocket comes to the top of the wheel its plunger is retracted to receive a previously measured quantity of fruit. As the top of the wheel turns toward the front of the machine the filled pocket is closed by a stationary segmental wall 107 arranged concentric with and approximately tangential to the wheel. In the further revolution about the fixed cam the rollers 104 are pushed outward to cause the plungers 102 to compress the fruit into a brick against wall 107. As the pocket rides free of the wall 107 and arrives at a point directly over a former opening, the cam 105 gives the plunger a sudden movement outward to expel the fruit brick into the former. During the return of the pocket to the top of the wheel again the plunger is retracted in readiness for the next charge.

The plunger 102 serves not only to compress the fruit in the feeder but also as a pusher to deliver the charge into the hollow former or fruit receptacle 4. This in fact is the principal object of the plungers 102. Dried prunes and the like are of such a sticky and gummy character, particularly after dipping or processing which is done just before packing, that some positive means must be employed to dislodge them from the feeder and insure their proper deposit in the receptacle designed to receive them. The plunger or pusher coming down on the fruit in the former remains for a moment with its lower end substantially flush with the upper inner surface of the former to close the ingress opening of the former and while the horizontal plunger 20 moves across the opening to carry the material into the closed cylinder part of the former. During this initial movement of the plunger 20 across the opening, the feeder and pusher 102 move in unison with the former carrier.

On the receipt of a charge of material into the open top of a former, its plunger 20 is moved inwardly to carry the fruit into the closed cylinder part of the former and there to compress it against a belt 108 running around pulleys 109 and having a plane supported by a rigid wall 110 Fig. 3 running parallel with the direction of travel of the carrier 4. A movable stop as the belt 108 in the path of plunger 20 is used for the reason that it is not desired to tear the folded end of the wrapper. If a rigid wall alone were used the friction on the parts would be too great. As it is the belt partakes of the same movement as the carrier 4 and compression is effected without undue friction.

When a plunger 20 is retracted by the guide section 85, as before described, its roller 22 encounters an oscillating guide 111 fulcrumed intermediate of its ends as at 112 and for a space the roller 22 runs on this lever. As it passes beyond the fulcrum 112, the guide section or carrier guide 85 has brought out the next succeeding plunger and its roller 22 hitting the end of guide 111 drives the first roller in toward the carrier 4 so that as it leaves the guide 111 it will be sure to pass in front of carrier guide 86. The oscillating guide 111 thus acts to limit the outward movement of a retracted plunger and to focus the plunger so that it will surely be carried in on the inward movement of guide 86.

It is the inward movement of carrier guide 86 that pushes the fruit into the former cylinder and up against the end of the wrapper and the belt 108. In this position the plunger rollers 22 travel from carrier guide 86 upon a fixed guide 113 wherefrom they are received in front of the carrier guide 87 at the discharge end of the machine.

As the former cylinder, with its outer wrapping and its compressed contents leave the support belt 108, the guide 87 is moved inwardly toward carrier 4 to push the compressed contents of the former cylinder and the paper wrapper from the cylinder, the filled wrapper now being received by a mechanism collectively designated as C Figs. 1 and 2, whereby the open end of the package is closed and sealed and the finished product finally discharged ready for the market. As the carrier guide 87 moves inwardly the roller 22 encounters a projection 114 Figs. 3 and 3ª on an arm 115 pivoted to the frame at 116 and carries the projection along with it. The arm 115 carries a hook 117 which is operated by a spring 118 to engage in behind a pin 119 on the under side of guide 87. When guide 87 is moved outwardly again, the pin 119 carries hook 117, arm 115 and consequently the plunger with it. The hook is released from behind the pin by the engagement of the hook with a rigid stop 120. Leaving plate 114, the retracted roller 22 passes around the rear end of the machine in suitable guides and the empty former returns to receive another sheet of paper; the operation of folding, pasting, filling, compressing, and discharge proceeding continuously with each succeeding former in the manner thus described.

The discharged package is received upon a stationary flat hopper-like support or table 120ª Fig. 38 across which it is pushed by the combined action of a plunger and a rod 121 which is fast to and movable with carrier 87, and is provided with a hinged pusher 122. This hinged pusher normally projects a package-length beyond the end of the formers and into the path of a package. A plunger will deposit a package on the table 120ª, on the next succeeding movement of carrier 87 to discharge a second package the pusher 122 will engage the first package and shove it across the table into a holder 123 on carrier 124. While the pusher and a plunger always reciprocate in unison, the pusher takes up the work begun by an immediately preceding plunger so while one package is being pushed off the table and into the end-folding device by the pusher, a second package is coming on to the table from the former, the hinged pusher being adapted to ride freely over a package on its return movement. The endless carrier 124 is disposed in vertical planes and passes over sprockets 125 journaled in a fixed part of frame A. The holders 123 are hung at suitable intervals on the carrier and the movement of the latter is so timed that a holder will come opposite the table just at the right instant always to receive a package from the pusher.

The carrier 124 is operated from shaft 10 Fig. 3 by the following means: A chain 126 passes over a sprocket on shaft 10 and a second sprocket on countershaft 127; from the latter, power is transmitted to a shaft of sprocket 125, the movement of carrier 124 being continuous like the rest of the machine.

The holders 123 shown in detail in Figs. 40 and 41 are pivotally supported on non-rotatable shafts or cross rods 128 which have their ends fixed in links of the chains of carrier 124; the rods make a half revolution in their passage around each sprocket 125. The holders are prevented from swinging on their pivots in their upward movement on one side and on their downward movement on the other by the engagement of the rollers 129 in suitable guides on the stationary carrier-support. Each holder conforms in shape and size to the finished package and has a top 130 hinged at the rear which coöperates with the bottom of the holder as a clamp to grip and hold a package during a portion of the final end-folding operation. A segment 131 is fastened to each cross rod 128, and like the latter makes a half revolution each time it passes around a sprocket 125. It is arranged in such position that on the upward movement of the holder when the package is received into the holder, a pin 132 carried by the segment will engage a part 133 on the lid to hold the latter open; during the downward movement of the holder on the other side the segment will bear on the lid to hold it closed on the package as shown by 134 Fig. 39; and during the passage of the holder around lower sprockets 125 will open the lid to allow the completed package to be discharged.

In operation a package is pushed by one plunger by the movement of carrier 87 on to table 120ª on the next succeeding movement of carrier 87 the pusher 122 shoves the package on into a holder 123 which has arrived in position. This leaves the filled package with the unsealed ends of the wrapper projecting beyond the front end of the holder. The continued movement of carrier 124 carries the package upward to bring the upper unfolded projecting edge of the wrapper against a hinged rubber 135 which is a little less in width than the width of the package and which causes this upper edge of the wrapper to be folded down as shown by the face 136 Fig. 38. Two rollers 137 next engage the sides of the projecting end of the wrapper to crease it along its vertical edges so that when the curved stationary member 138 is encountered by the lower part of the sheet, the wrapper end will present the two diamond-shaped folds 139 Fig. 38. This leaves the wrapper end with a triangular lip hanging down over the front end of the holder and supported against the slotted projection 140 of the holder. The disks 141 disposed tangential to the path of the end of the package act to form sharp creases at the corners and edges of the wrapper and to smooth the end fold. A paste roller 142 dipping into the paste pot 143 deposits paste on the portions 136 and 139 so that when the triangular pendent portion of the end is folded up the wrapper will be completely closed. As the holder passes over the top of the support a roller 144 on an arm 145 rigid with the holder engages a cam guide 146 to steady the holder and swing it forward out of the way of the next approaching carriage and to cause rollers 129 suitably to engage in the guides 147 which hold the holder and package horizontal on the downward movement of the holder and while passing the final folding means. This latter comprises a fixed vertical plate 148 Figs. 39—39ª between the two planes of carrier 124 and slotted at its upper end. A finger 149 is fulcrumed intermediate of its ends in this slot and has one end projecting out into the path of the downwardly hanging triangular part of the wrapper. The slot in the part 140 on the bottom of the holder is to accommodate the finger which latter acts to lead the pendent flap of the wrapper out over the top edge of the plate 148, while the other end of the finger swinging up behind lays this flap up against the end of the package and the folding operation is done. The continued downward movement of the holder carries the freshly sealed end of the wrapper against the rubber plate 148 which smooths the folds and allows the paste time to set.

Passing beyond guide 147 the holder is tilted and the lid opened by engagement of the rollers 129 with a guide 149ª and the turning of the segment in passing around the lower sprocket 125, and the finally completed package is discharged from the machine.

Having thus described my invention, what I claim and desire to secure by Letters Patent is—

1. In a packaging machine, the combination with a continuously operating carrier, of hollow formers thereon, means for folding a sheet about the sides and over one end of said formers, plungers reciprocating in the formers, means for delivering a charge of material to be packaged into the path of the plungers, means for operating the plungers to compress the material and to discharge the same and the wrapper from the formers, means for sealing the end of the filled wrapper, means for giving the carrier a continuous movement and means for giving the several parts a coördinate movement.

2. In a packaging machine, the combination with a continuously moving carrier of hollow formers thereon, associated devices for folding and sealing the edges of the sheet about the sides and over one end of the formers, plungers reciprocating in the formers, means for giving the carrier a continuous movement and means for operating the folding and sealing mechanisms and the plungers coördinately.

3. In a packaging machine, the combination with a continuously moving carrier, horizontally supported formers thereon, plungers reciprocating in said formers, means for folding a wrapper about the sides and over the ends of said formers, means for delivering material into the path of the plungers, means for operating the plungers to compress the material and to discharge the same and the wrapper from the formers, and means associated with the aforesaid mechanisms to close the open end of the package while the latter is maintained in a horizontal position.

4. In a packaging machine, the combination with a carrier of a horizontally supported removable hollow former thereon, said former having a limited oscillating movement and a plunger reciprocal in said former.

5. The combination with a continuously moving endless carrier of laterally projecting hollow formers thereon, devices associated with and operable by the carrier for folding a sheet about said former, means for compressing the material to be packaged in said formers, and for discharging said compressed material and wrappers from the formers.

6. The combination with a continuously moving carrier, of laterally projecting hollow formers thereon, means for folding a sheet about the side and over the ends of said formers during the movement of the carrier, means for charging the formers, means for discharging the formers of their contents and inclosing wrappers, and means for giving the carrier a continuous movement.

7. In a packaging machine the combination of an endless carrier, hollow lateral projecting formers thereon, plungers reciprocal in said formers, means for moving the plungers successively out and in, mechanism in the path and operatable by the formers to fold a sheet about the sides of the formers, devices for forming the end of the wrapper while on the former, and means for closing the end of the wrapper after it is discharged from the former.

8. In a packaging machine, the combination of an endless carrier, hollow wrapper formers thereon, means for folding a sheet about a former and for closing one end of the wrapper, means for partially compressing material to be packed prior to its entry to the former, means for delivering the partially compressed matter to the former and means for discharging said material and its containing wrapper from the formers.

9. In a packaging machine, the combination of a carrier, a hollow former removably supported thereon and having a limited pivotal movement, a plunger movable in said former and folding and sealing mechanism coöperatively associated with the carrier.

10. In a packaging machine for dried fruits and like sticky material, the combination of a carrier, a horizontally-disposed hollow former supported on the carrier, a plunger operative in the former, means for folding a wrapper-sheet about the sides and over one end of the former, means for delivering material into the former in advance of the plunger, said former having a lateral inlet for the material to be operated on by the plunger and means to operate the plunger.

11. In a packaging machine, the combination of an endless carrier, hollow formers thereon, means for folding a sheet about the four sides of said former, means for pasting and sealing the edge of the sheet so folded, means for folding the end of the sheet over the former, said infolding means including an oscillating arm operatable by the formers, means for delivering material to the formers, plungers operating in the formers, means for discharging the filled wrapper, and associated mechanism for sealing the open end of the package.

12. In a continuously operating packaging machine, the combination of a hollow former, means for giving the same a continuous movement, means for folding a sheet about the sides thereof and for pasting the edges of said sheet, means for closing the ends of the sheet over the ends of the former, means for charging the formers, means for discharging the contents of the formers and their inclosing wrappers, and means for closing the opened ends of the discharged package.

13. The combination of a continuously traveling hollow former, means for folding a wrapper sheet about said former, means for folding and pasting one end of the wrapper while on the former, means for filling the wrapper and means for closing the open end of the wrapper subsequent to its discharge from the former and means for giving said several means a coördinate movement.

14. The combination of a hollow former, means for folding a wrapper sheet around the same, means for closing one end of the wrapper, means for filling the latter, means for discharging the filled wrapper from the former and means for subsequently closing the open end of the wrapper and means for moving said former continuously during all of said operations.

15. The combination of a continuously traveling former, means for incasing said former with a container open at one end, means for compressing a charge in said former, means for discharging the compressed charge and container simultaneously and means for subsequently closing the open end of said container, means for moving the former continuously during said several operations.

16. The combination with an endless carrier and means for moving the same continuously, of a hollow laterally projecting former thereon, means for incasing said former with a container open at one end, means coacting with the traveling former for compressing a charge into brick-form prior to entry into said former, means for delivering said compressed charge into said former and means for simultaneously extruding the charge and container.

17. The combination of a hollow former, means for folding a sheet around the four sides thereof, and means for pasting down the edge of the sheet, means for folding the sheet over one end of the former, means for inserting material to be packaged into the former, means for compressing the material against the folded end of the wrapper and stationary means to support the latter in opposition to the compression means, means for discharging the filled wrapper from the former, and means for subsequently closing the open end of the wrapper and means for moving the former continuously during the charging, compressing and discharging operations.

18. In a packaging machine, the combination with a former-carrier, of means coöperating with said carrier for closing the sides and one end of a wrapper, and means for delivering a charge of material to said wrapper, said means including a rotatable support with peripheral pockets and means for compressing a charge in said pockets.

19. In a packaging machine for packaging sticky material, the combination with an endless carrier, of horizontally arranged, open ended hollow formers thereon, means for folding the sides and one end of a wrapper about said formers, means for charging the formers with material to be packaged and means for discharging the contents of the formers and the wrappers and a plunger operative in and carried by each former.

20. The combination with a continuously moving carrier, of laterally projecting hollow formers thereon, means for folding a sheet about the sides of the formers, end folding mechanism operatable by the formers, means for moving the carrier continuously means for charging the formers with material to be packaged, and means for discharging the contents of the formers and the wrappers simultaneously.

21. In a packaging machine, the combination of an endless carrier, laterally projecting hollow formers supported thereon, means for folding a sheet about the sides of the formers, paste mechanism associated with said folding means, devices operatable by the carrier for folding the end of the sheet over the end of a former means for operating the carrier continuously means for charging the formers with material to be packaged, and means to discharge the wrappers and the contents of the formers simultaneously.

22. In a packaging machine, a continuously operating carrier, hollow formers removably supported thereon and having a limited pivotal movement in the direction of their length, plungers in said formers, means for folding and sealing a sheet about the sides and over the end of the formers, means for delivering material into the former in advance of the plunger and means for operating the carrier continuously.

23. In a packaging machine, the combination with a carrier, of horizontally supported, laterally projecting removable formers thereon, plungers in said formers, rollers on the formers said formers having openings for the admission of material in advance of the plungers and trackways engaged by the rollers to hold them to the carrier.

24. In a packaging machine, the combination with a carrier, of horizontally-supported, laterally-projecting removable formers thereon, said formers having each an opening for the ingress of material to be packaged and a tubular part about which the wrapper is folded, and plungers in the formers.

25. The combination with a carrier, of a horizontally-supported removable hollow former thereon, said former having a limited oscillating movement in the plane of its length and a plunger in said former.

26. In a packaging machine for dried fruits and like sticky material, the combination of an endless traveling carrier, a horizontally arranged open-ended former on the carrier, and a plunger operated in and carried by the former, said former having a feed-opening on top.

27. In a packaging machine, the combination of a frame, sprockets mounted thereon, an endless carrier traveling around said sprockets, said carrier comprising a series of conjoined links, boxes having open ends and tops secured to said links, hollow formers supported in said boxes, plungers reciprocal in said formers and folding mechanisms.

28. In a packaging machine, the combination of a frame sprockets mounted thereon, an endless carrier traveling about said sprockets, said sprockets comprising a series of conjoined links, boxes having open ends and tops secured to said links, hollow formers removably supported in said boxes and having a tubular part projecting to one side of the carrier, plungers movable in the formers and folding mechanisms coöperatively associated with the formers.

29. In a packaging machine, the combination of a frame an endless carrier supported thereon, said carrier comprising a series of conjoined links, former-holders on said links and movable formers carried by said holders, plungers in the formers, associated folding mechanisms, means to charge the formers with material to be packaged and means to actuate the plungers to compress, and subsequently to discharge, the contents of the formers.

30. In a packaging machine, the combination of a frame, sprockets thereon, an endless carrier passing around said sprockets, said carrier comprising a series of conjoined links, former holders on said links, hollow formers removably supported in said holders and having a limited oscillating movement, said formers having a lateral tubular portion for the reception of the wrapper and an opening for the ingress of material to be packaged, plungers reciprocating in the formers and associated folding mechanisms.

31. In a packing machine, the combination of a frame, sprockets thereon, an endless carrier passing around said sprockets, said carrier comprising a series of conjoined links former holders on said links, hollow formers removably supported in said holders and having a limited oscillating movement, said formers having a lateral tubular portion for the reception of the wrapper and an opening for the ingress of material to be packaged, plungers reciprocating in the formers, parallel guides on the frame between which the formers and carriers are movable, and associated folding mechanisms.

32. In a packaging machine, the combination of a frame, sprockets thereon, an endless carrier supported on said sprockets, former holders on said endless carrier, hollow laterally projecting formers in said holders, parallel guides, between which the carrier and formers are movable, plungers in the formers, and associated folding mechanisms.

33. In a packaging machine, the combination of a frame, sprockets thereon, an endless link carrier traveling about said sprockets, former holders on said carrier, movable hollow laterally projecting formers in said holders, plungers in said formers, said plungers having roller bearing rods, guides for said rollers, and means coördinating with the carrier to reciprocate said plunger and associated folding mechanisms.

34. In a packaging machine, the combination of an endless carrier, means for giving said carrier a continuous movement, hollow laterally projecting formers on said carrier, folding mechanisms associated with the formers, plungers movable in the formers, and means having a coördinate movement with the carrier to reciprocate the plungers.

35. In a packaging machine, the combination of an endless link carrier, hollow laterally projecting formers thereon, plungers reciprocal therein, means for giving said carrier a continuous movement, means for operating said plungers synchronously with the movement of the carrier, folding mechanisms associated with and operatable by the carrier, to fold a wrapper about the sides and over an end of the formers, means to charge the formers with material to be packaged, and means to actuate the plungers to discharge the wrappers and the contents of the formers.

36. In a packaging machine, the combination of an endless link carrier, hollow laterally projecting formers thereon, plungers reciprocal therein, means for giving said carrier a continuous movement, means for operating said plungers synchronously with the movement of the carrier, folding mechanisms associated with and operatable by the carrier, and means for delivering a partially compressed charge of material to the formers.

37. In a packaging machine, the combination of an endless link carrier, hollow laterally projecting formers thereon, plungers reciprocal therein, means for giving said carrier a continuous movement, means for operating said plungers synchronously with the movement of the carrier, folding mechanisms associated with and operatable by the carrier, and means for delivering a partially compressed charge of material to the formers, said means including a rotary feeder in the path of and operatable by the carrier.

38. In a packaging machine, the combination of an endless link carrier, hollow laterally projecting formers thereon, plungers reciprocal therein, means for giving said carrier a continuous movement, means for operating said plungers synchronously with the movement of the carrier, folding mechanisms associated with and operatable by the carrier, means for delivering a partially compressed charge of material to the formers, said means including a rotary feeder in the path of and operatable by the carrier, said feeder having peripheral pockets and plungers operating in said pockets.

39. In a packaging machine, the combination of an endless link carrier, hollow laterally projecting formers thereon, plungers reciprocal therein, means for giving said carrier a continuous movement, means for operating said plungers synchronously with the movement of the carrier, folding mechanisms associated with and operatable by the carrier, means for delivering a partially compressed charge of material to the formers, said means including a rotary feeder in the path of and operatable by the carrier, said feeder having peripheral pockets and plungers operating in said pockets, and a segmental pressure plate in the path of said plungers.

40. In a packaging machine, the combination of an endless carrier, of laterally projecting tubular formers thereon, plungers reciprocal in said formers, means for delivering a charge of material into the formers in advance of the plungers, a means for folding a wrapper about said formers, said means including a rotary support having grippers arranged to engage the sides of the formers, end folding means operatable by the carrier and means for closing the ends of the packages on their discharge from the formers.

41. The combination with a series of successively arranged continuously moving formers of a rotatable support having hinged coöperating members interposable in the path of the formers and operatable by the latter and adapted to fold a sheet about four sides of a former, and means for moving the formers continuously.

42. The combination with a movable former, of a pivoted adjustable gripper having coöperating members engaging the former to fold and clamp a sheet about four sides of the latter.

43. The combination with a movable former of a pivotally hung gripper in the path of the former having coöperating adjustable members engaging the former to fold and clamp a sheet about the same.

44. The combination with a movable former, of a pivoted adjustable gripper having coöperating, spring-pressed members to engage a plurality of sides of said former and operatable by the movements of the former.

45. The combination with a movable former, of a pivoted adjustable gripper disposed in the path of said former and having coöperating gripper members engaging the former to fold the sheet about a plurality of sides of the same.

46. The combination with a movable former of a gripper in the path of the former and having adjustable pivotally connected coöperating members to fold and clamp a sheet about the sides of the former.

47. The combination with a movable former of a gripper in the path of the former and having adjustable pivotally connected coöperating members to fold and clamp a sheet about the sides of the former, means for applying paste to the edge of the sheet, and means for folding down said pasted edge.

48. The combination with a movable former, of a pivoted gripper in the path of the former and having adjustable hinged coöperating members to fold and clamp a sheet about the sides of the former, and means for applying paste to the edge of the sheet.

49. The combination of a plurality of successively arranged movable formers, of means in the path of and actuated by said formers to fold a sheet about each former, said means including a rotatable support having radially disposed hinged adjustable grippers engaging successive formers.

50. The combination of a plurality of successively arranged movable formers, of means in the path of said formers to fold a sheet about each former, said means including a rotatable support having radially-disposed hinged adjustable grippers engaging successive formers to fold and clamp the sheets.

51. The combination of a plurality of successively arranged movable formers, of means in the path of said formers to fold a sheet about each former, said means including a rotatable support having radially disposed hinged adjustable grippers engaging successive formers to fold and clamp the sheets, and means for moving said formers continuously.

52. The combination with a movable former, of means in the path of said former for folding a sheet about said former, said means including a rotatable support, and adjustable grippers disposed radially of said support to engage the sides of said former.

53. The combination with a movable former, of means for folding a sheet about the sides of said former, said means including a rotatable support having hinged adjustable grippers in the path of said former and adapted to engage the sides of said former.

54. The combination with a continuously traveling hollow former, of means in the path of and actuated by said former to fold a container sheet about it, said means including a rotatable support having radially disposed hinged adjustable grippers adapted to embrace the former.

55. The combination with a traveling hollow former, of means in the path of and actuated by said former to fold a container sheet about it, said means including a rotatable support having radially disposed hinged adjustable grippers adapted to embrace the former, and means for giving said former a continuous movement.

56. The combination with a movable hollow former of means in the path of and operable by said former for automatically folding a sheet of paper about the four sides thereof, means for pasting and sealing the folded edge of the sheet, means operable by the former for folding said sheet over the end of the former, means for charging the former with material to be packaged, and means to discharge the contents of the former and the folded sheet.

57. The combination with a movable hollow former of means in the path of and operatable by said former for automatically folding a sheet of paper about the four sides thereof, means for pasting and sealing the folded edge of the sheet, means operatable by the former for folding said sheet over the end of the former, means for moving said former continuously, means for filling the wrapper while on the former, said former having a lateral opening for the admission of material to be packaged, and means to move the plunger.

58. The combination with a movable former of means for folding a sheet about said former, said means including a rotatable support and hinged coöperating roller bearing arms thereon interposable in the path of the former.

59. The combination with a movable former, of means for folding a sheet thereabout, said means including a rotatable support, and radially disposed pivotally-hung grippers interposable in the path of said former.

60. The combination with a hollow former, of means for folding and gripping a sheet about said former, said means including two hinged pivotally supported arms, arranged at approximately right angles to one another, and having inturned end portions adapted to grip over opposite corners of the former, devices for folding the sheet over the end of the former and a plunger in the former co-acting with said end folding devices to support the sheet during the folding operation.

61. The combination with a former, of means for folding and gripping a sheet about said former, said means including two pivotally-supported and pivotally-connected arms carrying adjacently disposed rollers arranged to grip over opposite corners of the former.

62. The combination with a former, of means for folding and gripping a sheet about said former, said means including two pivotally-supported and pivotally-connected arms carrying adjacently disposed rollers arranged to grip over opposite corners of the former, means for causing said arms to approach each other and means for limiting the amount of said approach.

63. The combination with a hollow former, of means for folding and gripping a sheet about said former, said means including a support, two arms pivoted on said support approximately at right angles to each other and carrying each a roller at one end, devices for folding the sheet over the end of the former and a plunger in the former co-acting with said end folding devices to support the sheet during the folding operation.

64. The combination with a former, of means for folding and gripping a sheet about said former, said means including a support, two arms pivoted on said support approximately at right angles to each other and carrying each a roller at one end, and means whereby said arms are capable of a limited movement to and from each other.

65. The combination with a series of traveling hollow formers, of means for folding a wrapper thereabout, said means including a rotary support, radially disposed grippers thereon disposed in the path of said formers and guide means directing the movements of said grippers, devices for folding the sheet over the end of the former and a plunger in the former co-acting with said end folding devices to support the sheet during the folding operation.

66. The combination with a series of traveling formers, of means for folding a wrapper thereabout, said means including a rotary support, radially disposed grippers thereon disposed in the path of said formers, guide means directing the movements of said grippers, and means for giving said formers a continuous movement.

67. The combination with a series of traveling formers, of means for folding a wrapper thereabout, said means including a rotary support, radially disposed grippers thereon disposed in the path of said formers, guide means directing the movements of said grippers and means for limiting the movement of said support in one direction.

68. The combination with a movable hollow former, of a pivoted adjustable gripper disposed in the path of said former and having coöperating gripper members engaging the former to fold the sheet about a plurality of sides of the same, devices for folding the sheet over the end of the former and a plunger in the former co-acting with said end folding devices to support the sheet during the folding operation.

69. In a packaging machine, the combination of an endless carrier, laterally projecting hollow formers carried thereby, means for folding sheets about the sides of said formers, means for folding the ends of the sheets over the ends of the formers, said means including an oscillating carrier in the path of the formers, plungers in said formers co-acting with said end folding means to support the sheet, means to operate the plungers, and means to fill the wrappers while on the formers.

70. The combination with a hollow former, of means for continuously moving the same, of means for folding a sheet over the end of said former, said folding means including a part movable with the former and carrying devices for folding two sides of the end of said sheet, a plunger in said former co-acting with said end folding means to support the sheet, means to operate the plunger.

71. The combination with a movable hollow former and means for folding a sheet about it, a means for closing an end of the sheet over the former, said closing means including an oscillating arm and hinged coöperating folders carried thereby having a movement coördinate with that of the former, a plunger in said former co-acting with said end folding means to support the sheet, means to operate the plunger.

72. The combination with a movable former and means for folding a sheet about it, a means for closing an end of the sheet over the former, said closing means including an oscillating arm and hinged coöperating folders carried thereby having a movement coördinate with that of the former, and means for giving said former a continuous movement.

73. The combination with a hollow former and means for moving the same continuously, means including coöperating hinged grippers for folding a sheet about the four sides of said former, a part movable with the former and having folding devices to close the end of the sheet over the end of the former, a plunger in said former co-acting with said end folding means to support the sheet, means to operate the plunger, means to charge the former with material to be packaged and means to discharge the contents of the former and the infolded sheet.

74. In a packaging machine, the combination with a hollow former of end folding mechanism including a part movable with the former, said part having folding members mounted on axes at right angles to each other, means for giving said members a coordinate movement, a plunger in said former co-acting with said end folding means to support the sheet, means to operate the plunger.

75. In a packaging machine, the combination with a hollow former of an oscillating part engageable by and movable with said former and folding members carried by said part and oscillating at right angles across the end of said former, means for effecting the oscillation of said members, a plunger in the former, said former having a lateral opening for the admission of material to be packaged, and means to operate the plunger.

76. In a packaging machine, the combination with a traveling former of an oscillating part engageable by said former, a bell crank lever carried by said part and carrying a folding means operating across the end of the former, a plate hinged to operate at right angles to said bell crank lever and across the end of the former to fold an edge of the wrapper end, means for moving said lever and plate successively.

77. In a packaging machine, the combination with a traveling former of an oscillating part having a pivotally supported roller arranged in the path of the former, a folding device carried by the oscillating part and arranged to operate across the end of the former to fold the top projecting edge of the sheet, an oscillating plate operating at right angles to said folding device, stop means in the path of the plate to effect its oscillation in one direction, means for locking the plate across the end of the former and means for releasing said plate on the disengagement of said roller from the former.

78. In a packaging machine, the combination of a frame, sprockets on horizontal axes at the end of said frame, an endless carrier on said sprockets, laterally projecting hollow formers on said carrier, means for folding a sheet about the sides of the formers, means for pasting the edges of a sheet so folded, means for folding the ends of the sheets over the ends of the formers, a rotary support intermediate the said means for folding the sheet about the sides of the former and the said means for folding the sheets over the ends of the formers, said rotary support having radial holders to engage the sides of the folded sheet in its passage around said support and means for effecting the reciprocation of said holders.

79. The combination with a movable former and coöperatively associated folding mechanisms, of means for supporting a wrapper on said former, said means including a rotary support having peripheral pockets and reciprocating holders.

80. The combination with a movable former and coöperatively associated folding mechanisms, of means for supporting a wrapper on said former, said means including a rotary support having peripheral pockets and reciprocating holders, and means for projecting said holders outwardly to engage the sides of the former and to retract the holders to release the former.

81. In a packaging machine, the combination of an endless carrier, a series of successively arranged hollow, laterally projecting formers thereon, means for folding a sheet about the sides of said formers, means for pasting the edges of said folded sheet, end folding sealing mechanism, plungers in said formers and means for maintaining the ends of the plungers flush with the ends of the formers during the folding and sealing operations, means for reciprocating the plungers and means for charging the formers with material to be packaged.

82. In a packaging machine, the combination of an endless carrier, a series of successively arranged, hollow, laterally-projecting formers thereon, means for folding a sheet about the sides of said formers, means for pasting the edges of said folded sheet, end folding and sealing mechanisms, plungers in said formers and means for maintaining the ends of the plungers flush with the ends of the formers during the folding and sealing operations, means for moving said carrier continuously, and means for reciprocating the plungers, said formers having lateral openings for the admission of material to be packaged.

83. In a packaging machine, the combination of an endless carrier, a series of successively-arranged, hollow, laterally projecting formers thereon, grippers in the path of the formers, paste mechanism associated with said grippers, end folding mechanism, plungers in the formers, means to charge the formers with material to be packaged, and stop means contiguous to the ends of the formers and in the path of the plungers against which the contents of the formers may be compressed.

84. In a packaging machine, the combination of an endless carrier, a series of successively arranged, hollow, laterally projecting formers thereon, grippers in the path of the formers, paste mechanism associated with said grippers, end folding mechanism, plungers in the formers, means to charge the formers with material to be packaged, and stop means contiguous to the ends of the formers and in the path of the plungers against which the contents of the formers may be compressed, and means for giving the carrier a continuous movement.

85. In a packaging machine, the combination of an endless carrier, a series of successively arranged, hollow, laterally projecting formers thereon, grippers in the path of the formers paste mechanism associated with said grippers, end folding mechanism, plungers in the formers means to charge the formers with material to be packaged, and stop means contiguous to the ends of the formers and in the path of the plungers against which the contents of the formers may be compressed, said stop means including a movable belt 108.

86. In a packaging machine, the combination of a carrier a series of successively-arranged, hollow, laterally-projecting formers, mechanism in the path of and operatable by the formers to fold a sheet about a former, end-folding mechanism operatable by the formers to fold the top and rear edge of the sheet over the end of a former, means in the path of the end of the sheet to fold the remaining edges thereof, plungers in the formers and stop means in the path of the plungers.

87. In a packaging machine, the combination of a carrier a series of successively arranged, hollow, laterally-projecting formers, mechanism in the path of and operatable by the formers to fold a sheet about a former, end-folding mechanism operatable by the formers to fold the top and rear edge of the sheet over the end of a former, means in the path of the end of the sheet to fold the remaining edges thereof, plungers in the formers and stop means in the path of the plungers, means for operating the carrier continuously and means for operating said plungers coördinately with the carrier.

88. In a packaging machine, the combination of a carrier, a series of successively arranged hollow, horizontal formers, means for wrapping a sheet about, and over the end of said formers, means for charging the formers with material to be packaged, means for compressing said material, means for ejecting the compressed material and wrapper, and means coördinated with the carrier to close the open end of the ejected package.

89. In a packaging machine, the combination of a carrier, a series of successively arranged hollow, horizontal formers, means for wrapping a sheet about, and over the end of said formers, means for charging the formers with material to be packaged, means for compressing said material, means for ejecting the compressed material and wrapper, and means coördinated with the carrier to close the open end of the ejected package while the same is maintained in horizontal position.

90. In a packaging machine, the combination of a carrier a series of successively arranged hollow, horizontal formers, means for wrapping a sheet about, and over the end of, said formers, means for charging the formers with material to be packaged, means for compressing said material, means for ejecting the compressed material and wrapper, and means coördinated with the carrier to close the open end of the ejected package, and means for operating the carrier continuously.

91. In a packing machine, a hollow horizontal former, a plunger in said former, means for wrapping a sheet about, and over the end of, said former, means for charging the former with material to be packaged in advance of the plunger, means for operating the plunger to compress the material and to eject the compressed material and wrapper.

92. In a packaging machine, a hollow horizontal former a plunger in said former, means for wrapping a sheet about, and over the end of, said former, means for charging the former with material to be packaged in advance of the plunger, means for operating the plunger to compress the material and to eject the compressed material and wrapper, and means for moving the former continuously.

93. In a packaging machine, a hollow horizontal former, a plunger in said former, means for wrapping a sheet about, and over the end of, said former, means for charging the former with material to be packaged in advance of the plunger, means for operating the plunger to compress the material and to eject the compressed material and wrapper, means for closing the open end of the ejected package, and means for maintaining the ejected package in horizontal position while the open end is being closed.

94. In a packaging machine, a hollow horizontal former, a plunger in said former, means for wrapping a sheet about, and over the end of, said former, means for charging the former with material to be packaged in advance of the plunger, means for operating the plunger to compress the material and to eject the compressed material and wrapper, means for closing the open end of the ejected package and means for maintaining the ejected package in horizontal position while the open end is being closed, and means for moving the former continuously.

95. In a fruit packaging machine, a series of successively-arranged, horizontal, hollow, continuously-traveling formers, means for forming a wrapper about and over the end of, said formers, plungers in said formers, means for charging the formers with fruit in advance of the plungers, means for operating the plungers to compress the fruit and to eject the same and the wrapper and means for causing the formers to travel continuously.

96. In a fruit packaging machine, a series of successively-arranged, horizontal, hollow, continuously-traveling formers, means for forming a wrapper about and over the end of, said formers, plungers in said formers, means for charging the formers with fruit in advance of the plungers, means for operating the plungers to compress the fruit and to eject the same and the wrapper, means for causing the formers to travel continuously and means having a coordinate movement with the formers to close the end of the ejected package.

97. In a fruit packaging machine, a series of successively-arranged, horizontal, hollow, continuously-traveling formers, means for forming a wrapper about and over the end of said formers, plungers in said formers, means for charging the formers with fruit in advance of the plungers, means for operating the plungers to compress the fruit and to eject the same and the wrapper, means for causing the formers to travel continuously, and means having coordinate movement with the formers for maintaining the ejected package in horizontal position during the closing of the open end and means for closing said open end.

98. In a fruit packaging machine, the combination of a hollow movable former, means for wrapping a sheet about and over the end of the same and for pasting and drying the edges of said sheet, a plunger reciprocating in said former, said former having an opening for the entry of fruit into the former in advance of the plunger and means for operating the plunger to compress the fruit and to discharge the compressed fruit and wrapper.

99. In a fruit packaging machine, the combination of a hollow movable former, means for wrapping a sheet about and over the end of the same and for pasting and drying the edges of said sheet, a plunger reciprocating in said former, said former having an opening for the entry of fruit in the former in advance of the plunger, means for operating the plunger to compress the fruit and to discharge the compressed fruit and wrapper, and means for moving the former continuously.

100. In a packaging machine, the combination with a series of horizontal, hollow, successively arranged formers, of plungers movable in said formers, and means for moving said plungers, said means including a series of carriers operating transverse to the path of movement of the formers, and means for giving the formers and said carriers a coördinate movement, means for folding a sheet about the formers and means for charging the formers with material to be packaged.

101. In a packaging machine, the combination with a series of horizontal, hollow, successively arranged formers, of plungers movable in said formers, and means for moving said plungers, said means including a series of carriers operating transverse to the path of movement of the formers, means for giving the formers and said carriers a coördinate movement, and means for causing the formers to travel continuously, means for folding a sheet about the formers and means for charging the formers with material to be packaged.

102. In a packaging machine, the combination of a horizontally disposed hollow, movable former, a plunger in said former, a means for reciprocating said plunger, said means including a series of successively arranged carriers operatable transverse to the path of movement of the former, means to operate the carriers, and means carried by the plungers engaging said carriers.

103. In a packaging machine, the combination of a horizontally disposed hollow, movable former, a plunger in said former, a means for reciprocating said plunger, said means including a series of successively arranged carriers operatable transverse to the path of movement of the former, means to operate the carriers, means carried by the plungers engaging said carriers, and means for causing said former to travel continuously.

104. In a packaging machine, the combination with a traveling hollow former, of a plunger reciprocating in said former, a plunger rod, a roller carried by said rod and a series of successively arranged reciprocating carriers operating transverse to the path of movement of the former engaging said roller to reciprocate the former, and means to operate the carriers.

105. In a packaging machine, the combination with a traveling hollow former, of a plunger reciprocating in said former, a plunger rod, a roller carried by said rod and a series of successively arranged reciprocating carriers operating transverse to the path of movement of the former engaging said roller to reciprocate the former, means to operate the carriers and means for causing said former to travel continuously.

106. In a packaging machine, the combination with a traveling hollow former, of a plunger therein, a roller carried by said plunger, and a series of reciprocating guide sections operatable transverse to the path of movement of the formers, and interposable in the path of said roller to reciprocate the plunger, and means to operate the guide sections.

107. In a packaging machine, the combination with a traveling hollow former, of a plunger therein, a roller carried by said plunger, a series of reciprocating guide sections operatable transverse to the path of movement of the formers, interposable in the path of said roller to reciprocate the plunger, means to operate the guide sections and means for moving said former continuously.

108. In a packaging machine, the combination of a hollow traveling former of a plunger therein, means operating transverse to the path of movement of the former to carry the plunger outward, means to carry the plunger inward and intermediate mechanism between said inwardly and outwardly moving means to regulate the movement of the plunger relative to said inwardly moving means.

109. In a packaging machine, the combination of a hollow traveling former of a plunger therein, means operating transverse to the path of movement of the former to carry the plunger outward, means to carry the plunger inward and intermediate mechanism between said inwardly and outwardly moving means to regulate the movement of the plunger relative to said inwardly moving means, and means for moving the former continuously.

110. In a packaging machine, the combination with a traveling hollow former, of a plunger therein, devices operatable transverse to the path of movement of the former to reciprocate the plunger and stop means in the path of the plunger to limit its movement, means for folding a wrapper sheet about the former and means for filling the wrapper while on the former.

111. In a packaging machine, the combination with a traveling hollow former, of a plunger therein, devices operatable transverse to the path of movement of the former to reciprocate the plunger, stop means in the path of the plunger to limit its movement, means for moving the former continuously, means for folding a wrapper about the former and means for filling the wrapper while on the former.

112. In a packaging machine, the combination with a traveling hollow former, of a plunger therein, means for moving the plunger outward, stop means including an oscillating lever to limit the outward movement of the plunger, means for moving the plunger inwardly, and means for giving the former a continuous movement.

113. In a packaging machine, the combination with a hollow traveling former of a plunger therein, a series of successively arranged devices operating transverse to the movement of the former to reciprocate the plunger, and means including an oscillating lever limiting the outward movement of the plunger.

114. In a packaging machine, the combination with a hollow traveling former of a plunger therein, a series of successively arranged devices operating transverse to the movement of the former to reciprocate the plunger, means including an oscillating lever limiting the outward movement of the plunger and means for giving the former a continuous movement.

115. In a packaging machine, the combination with a hollow traveling former of a plunger therein, a series of successively arranged reciprocating carrier guide sections, a part on said plunger engageable by said sections, means for reciprocating said sections to operate the plunger, means for folding a wrapper sheet about the former and means for delivering material into the former in advance of the plunger.

116. In a packaging machine, the combination with a traveling hollow former of a plunger therein, a series of successively arranged reciprocating carrier guide sections, a part on said plunger engageable by said sections, means for reciprocating said sections to operate the plunger, and means for giving the former a continuous movement.

117. In a packaging machine, the combination with a traveling hollow former, of a plunger therein, a series of successively arranged reciprocating carrier guide sections, a part on said plunger engageable by said sections, means for reciprocating said sections to operate the plunger, and an oscillating guide interposable in the path of the plunger to limit and direct the movement of the latter.

118. In a packaging machine, the combination with a traveling hollow former, of a plunger therein, a series of successively arranged reciprocating carrier guide sections, a part on said plunger engageable by said sections, means for reciprocating said sections to operate the plunger, an oscillating guide interposable in the path of the plunger to limit and direct the movement of the latter, and means for giving the former a continuous movement.

119. In a packaging machine, the combination of a hollow traveling former, a plunger reciprocating therein, devices for reciprocating the plunger, means for feeding material into the former in advance of the retraction of the plunger, devices for reciprocating the plunger to compress material in the former, stop means in the path of the plunger against which the contained material is compressed and means for giving the former a continuous movement.

120. In a packaging machine, the combination with a hollow traveling former, of a plunger therein, means for retracting the plunger, means in the path of and operatable by the former to deliver a charge thereinto in advance of the retracting plunger, means for reciprocating the latter to compress the delivered charge, stop means in the path of the plunger against which said charge is compressed, and means for giving the former a continuous movement.

121. In a packaging machine, the combination of a hollow traveling former, a plunger therein, carrier guide sections reciprocal transverse to the path of movement of the former to retract the plunger, an oscillating guide stop limiting the outward movement of the plunger, means for reciprocating the plunger inward, and means intermediate of said outward and inward reciprocating plunger means for delivering a charge of material into said former.

122. In a packaging machine, the combination of a hollow traveling former, a plunger therein, carrier guide sections reciprocal transverse to the path of movement of the former to retract the plunger, an oscillating guide stop limiting the outward movement of the plunger, means for reciprocating the plunger inward, means intermediate of said outward - and inward - reciprocating-plunger-means for delivering a charge of material into said former, and means for giving the former a continuous movement.

123. In a packaging machine, the combination of a hollow traveling former, a plunger therein, carrier guide sections reciprocal transverse to the path of movement of the former to retract the plunger, an oscillating guide stop limiting the outward movement of the plunger, means for reciprocating the plunger inward, means intermediate of said outward-and inward-reciprocating-plunger-means for delivering a charge of material into said former, said feed means operatable by the former, and means for giving the former a continuous movement.

124. In a packaging machine, the combination with a hollow traveling former, of means for wrapping the sheet about and over the end of the same, a plunger in said former, a series of successively arranged reciprocating carrier guide sections interposable in the path of a part carried by the plunger to reciprocate the latter, means for delivering a charge of material into the former, and means associated with said carrier guide sections to operate the plunger to expel the contents of the former and the inclosing wrapper.

125. In a packaging machine, the combination with a hollow traveling former, of means for wrapping the sheet about and over the end of the same, a plunger in said former, a series of successively arranged reciprocating carrier guide sections interposable in the path of a part carried by the plunger to reciprocate the latter, means for delivering a charge of material into the former, means associated with said carrier guide sections to operate the plunger to expel the contents of the former and the inclosing wrapper, and means for giving the former a continuous movement.

126. In a packaging machine, the combination with a hollow traveling former of a plunger therein, and means for reciprocating said plunger, said means including a carrier reciprocal at right angles to the path of movement of the former and having means interposable in the path of a part carried by the plunger means for moving the former continuously, and means for moving the former and said carrier synchronously, means for folding a wrapper about the former and means for filling the wrapper while on the former.

127. In a packaging machine, the combination with a hollow traveling former of a plunger therein, a plunger rod, a roller carried by said plunger rod, a series of successively arranged reciprocating carriers interposable in the path of said roller, and an intermediate oscillating centering guide.

128. In a packaging machine, the combination with a hollow traveling former of a plunger therein, a plunger rod, a roller carried by said plunger rod, a series of successively arranged reciprocating carriers interposable in the path of said roller, an intermediate oscillating centering guide, and means for moving said former continuously.

129. In a packaging machine, the combination with a hollow traveling former of a plunger therein, a plunger rod, a roller carried by said plunger rod, a series of successively arranged reciprocating carriers interposable in the path of said roller, an intermediate oscillating centering guide, means for moving said former continuously, and means for delivering material to be packaged into said former.

130. In a packaging machine, the combination with a hollow traveling former of a plunger therein, a plunger rod, a roller carried by said plunger rod, a series of successively arranged reciprocating carriers interposable in the path of said roller, an intermediate oscillating centering guide, means for moving said former continuously, means for forming a wrapper about and over the end of the former, means for delivering material to be packaged into the former, means associated with said carrier guides to operate the plunger to eject the contents of the former and the inclosing wrapper.

131. In a packaging machine, the combination with a hollow traveling former of a plunger therein, a plunger rod, a roller carried by said plunger rod, a series of successively arranged reciprocating carriers interposable in the path of said roller, an intermediate oscillating centering guide, means for moving said former continuously, means for forming a wrapper about and over the end of the former, means for delivering material to be packaged into the former, means associated with said carrier guides to operate the plunger to eject the contents of the former and the inclosing wrapper, and means for moving the former continuously.

132. In a packaging machine, the combination with a hollow traveling former, of means for forming a wrapper about and over the ends thereof, of means for delivering material into the former, a plunger to compress the contents of said former, stop means in the path of the plunger against which said contents are compressed, said stop means having a limited amount of travel in unison with said former.

133. In a packaging machine, the combination with a hollow traveling former, of means for forming a wrapper about and over the ends thereof, of means for delivering material into the former, a plunger to compress the contents of said former, stop means in the path of the plunger against which said contents are compressed, said stop means having a limited amount of travel in unison with said former, and means for giving the former a continuous movement.

134. In a packaging machine, the combination with a hollow traveling former, of means for forming a wrapper about and over the ends thereof, of means for delivering material into the former, a plunger to compress the contents of said former, stop means in the path of the plunger against which said contents are compressed, a carrier operatable at right angles to the path of movement of the former engaging a part carried by the plunger to reciprocate the latter and expel the contents of the former and the inclosed wrapper, means to operate the carrier and means carried by said carrier to retract the plunger.

135. In a packaging machine, the combination with a hollow traveling former, of means for forming a wrapper about and over the ends thereof, of means for delivering material into the former, a plunger to compress the contents of said former, stop means in the path of the plunger against which said contents are compressed, a carrier operatable at right angles to the path of movement of the former engaging a part carried by the plunger to reciprocate the latter and expel the contents of the former and the inclosed wrapper, means to operate the carrier, means carried by said carrier to retract the plunger, and means for giving the former a continuous movement.

136. In a packaging machine, the combination with a hollow traveling former, of means for forming a wrapper about and over the ends thereof, of means for delivering material into the former, a plunger to compress the contents of said former, stop means in the path of the plunger against which said contents are compressed, a carrier operatable at right angles to the path of movement of the former engaging the part carried by the plunger to reciprocate the latter and expel the contents of the former and the inclosed wrapper, means to operate the carrier, means carried by said carrier to retract the plunger, means for giving the former a continuous movement, and means having a coördinate movement with the formers for closing the open end of the filled wrapper.

137. In a packaging machine, the combination with a hollow traveling former of a plunger therein, a plunger rod, a roller carried by said plunger rod, a series of successively arranged reciprocating carriers interposable in the path of said roller, an intermediate oscillating centering guide, means for moving said former continuously, means for forming a wrapper about and over the end of the former, means for delivering material to be packaged into the former, means associated with said carrier guides to eject the contents of the former and the inclosing wrapper, means for moving the former continuously, and means having a coördinate movement with the formers for closing the open end of the filled wrapper.

138. In a packaging machine, the combination with a hollow traveling former, of means for wrapping the sheet about and over the end of the same, a plunger in said former, a series of successively arranged reciprocating carrier guide sections interposable in the path of a part carried by the plunger to reciprocate the latter, means for delivering a charge of material into the former, means associated with said carrier guide sections to operate the plunger to expel the contents of the former and the inclosing wrapper, means for giving the former a continuous movement, and means having a coördinate movement with the formers for closing the open end of the filled wrapper.

139. In a packaging machine, the combination with a hollow traveling former, of means for wrapping the sheet about and over the end of the same, a plunger in said former, a series of successively arranged reciprocating carrier guide sections interposable in the path of a part carried by the plunger to reciprocate the latter, means for delivering a charge of material into the former, means associated with said carrier guide sections to operate the plunger to expel the contents of the former and the inclosing wrapper, and means for closing the open end of the filled wrapper.

140. In a packaging machine, the combination with a hollow traveling former, of means for wrapping the sheet about and over the end of the same, a plunger in said former, a series of successively arranged reciprocating carrier guide sections interposable in the path of a part carried by the plunger to reciprocate the latter, means for delivering a charge of material into the former, means associated with said carrier guide sections to operate the plunger to expel the contents of the former and the inclosing wrapper, and means for closing the open end of the filled wrapper, said means including a series of movable holders having a movement coördinate with that of the formers.

141. In a packaging machine the combination with a carrier provided with hollow formers, of associated devices for forming a wrapper about the sides and over one end of the formers, plungers in said formers, means for charging the formers with material to be packaged during the movement of the carrier, means to operate the plungers to discharge contents of the formers and the inclosing wrappers, and means for closing the open end of the filled wrapper.

142. In a packaging machine the combination with a carrier provided with hollow formers, of associated devices for forming a wrapper about the sides and over one end of the formers, plungers in said formers, means for charging the formers with material to be packaged during the movement of the carrier, means to operate the plungers to discharge the contents of the formers and the inclosing wrappers, means for closing the open end of the filled wrapper, and means for operating the carrier continuously.

143. In a packaging machine the combination with a carrier provided with hollow formers, of associated devices for forming a wrapper about the sides and over one end of the formers, plungers in said formers, means for charging the formers with material to be packaged during the movement of the carrier, means to operate the plungers to discharge the contents of the formers and the inclosing wrappers, means for closing the open end of the filled wrapper, and means for operating the carrier and the package closing means continuously.

144. In a packaging machine the combination with a carrier provided with hollow formers, of associated devices for forming a wrapper about the sides and over one end of the formers, plungers in said formers, means for charging the formers with material to be packaged during the movement of the carrier, means to operate the plungers to discharge the contents of the formers and the inclosing wrappers, means for closing the open end of the filled wrapper, means for operating the carrier continuously, and means for giving a coördinate movement to the carrier, wrapper-forming means, plungers and package-closing means.

145. In a packaging machine, the combination with a continuously moving carrier, horizontally supported formers thereon, plungers reciprocating in said formers, means for folding a wrapper about the sides and over the ends of said formers, means for delivering material into the path of the plungers, means for operating the plungers to compress the material and to discharge the same and the wrapper from the formers, and means associated with the aforesaid mechanisms to close the open end of the package while the latter is maintained in a horizontal position, said means including a series of holders movable in vertical planes.

146. In a packaging machine, the combination with a continuously moving carrier, horizontally supported formers thereon, plungers reciprocating in said formers, means for folding a wrapper about the sides and over the ends of said formers, means for delivering material into the path of the plungers, means for operating the plungers to compress the material and to discharge the same and the wrapper from the formers, means associated with the aforesaid mechanisms to close the open end of the package while the latter is maintained in a horizontal position, said means including a series of holders movable in vertical planes, and means for operating the formers and holders coördinately and continuously.

147. The combination with a continuously moving endless carrier of laterally projecting hollow formers thereon, devices associated with and operatable by the carrier for folding a sheet about said former, means for compressing the material to be packaged in said formers and for discharging said compressed material and wrappers from the formers, and means coöperatively associated with the formers for closing the open end of the filled wrappers.

148. The combination with a continuously moving carrier, of laterally projecting hollow formers thereon, means for folding a sheet about the side and over the ends of said formers during the movement of the carrier, means for charging the formers, means for discharging the formers of their contents and inclosing wrappers, means for giving the carrier a continuous movement, and means coöperatively associated with the formers for closing the open end of the filled wrappers.

149. In a continuously operating packaging machine, the combination of a hollow former, means for giving the same a continuous movement, means for folding a sheet about the sides thereof and for pasting the edges of said sheet, means for closing the ends of the sheet over the ends of the former, means for charging the formers, means for discharging the formers and their inclosing wrappers, and means for closing the open ends of the discharged package, said end-closing means including a series of holders movable in vertical planes.

150. The combination of a continuously traveling former, means for incasing said former with a container open at one end, means for compressing a charge in said former, means for discharging the compressed charge and container simultaneously, means for subsequently closing the open end of said container, means for moving the former continuously during said several operations, said end closing means including a series of movable holders and associated folding mechanism.

151. The combination of a hollow former, means for folding a sheet around the four sides thereof, and means for pasting down the edge of the sheet, means for folding the sheet over one end of the former, means for inserting material to be packaged into the former, means for compressing the material against the folded end of the wrapper and stationary means to support the latter in opposition to the compression means, means for discharging the filled wrapper from the former, means for subsequently closing the open end of the wrapper said end-closing means comprising an endless carrier, holders thereon and associated end folders, and means for moving the holders and former coördinately and continuously.

152. In a packaging machine, the combination of a carrier, a series of successively arranged hollow, horizontal formers, means for wrapping a sheet about and over the end of said formers, means for charging the formers with material to be packaged, means for compressing said material, means for ejecting the compressed material and wrapper, and means coördinated with the carrier to close the open end of the ejected package, said end-closing means including holders movable in vertical planes with associated end-folders.

153. In a packaging machine, the combination of a carrier, a series of successively arranged hollow, horizontal formers, means for wrapping a sheet about and over the end of said formers, means for charging the formers with material to be packaged, means for compressing said material, means for ejecting the compressed material and wrapper, and means coördinated with the carrier to close the open end of the ejected package while the same is maintained in horizontal position, said means including holders movable in vertical planes and associated folding mechanism disposed relative to the direction of movement of said holders.

154. In a packaging machine, a hollow horizontal former, a plunger in said former, means for wrapping a sheet about, and over the end of said former, means for charging the former with material to be packaged in advance of the plunger, means for operating the plunger to compress the material and to eject the compressed material and wrapper, a stationary support on which said filled wrapper is discharged, and means associated with said support to close the open end of the filled wrapper.

155. In a packaging machine, a hollow horizontal former, a plunger in said former, means for wrapping a sheet about, and over the end of said former, means for charging the former with material to be packaged in advance of the plunger, means for operating the plunger to compress the material and to eject the compressed material and wrapper, a stationary support on which said filled wrapper is discharged, means associated with said support to close the open end of the filled wrapper, and means coöperating with the plunger to deliver the filled wrapper from said support to the end-closing means.

156. In a fruit packaging machine, a series of successively arranged, horizontal, hollow, continuously-traveling formers, means for forming a wrapper about and over the end of said formers, plungers in said formers, means for charging the formers with fruit in advance of the plungers, means for operating the plungers to compress the fruit and to eject the same and the wrapper and means for causing the formers to travel continuously, a stationary support on which the filled wrapper is delivered, means for closing the open end of the filled wrapper and means associated with the plunger to deliver the wrapper from said support to the end-closing means.

157. In a fruit packaging machine, a series of successively-arranged, horizontal, hollow, continuously-traveling formers, means for forming a wrapper about, and over the end of, said formers, plungers in said formers, means for charging the formers with fruit in advance of the plungers, means for operating the plungers to compress the fruit and to eject the same and the wrapper, means for causing the formers to travel continuously, and means having a coördinate movement with the formers to close the end of the ejected package, said means including a series of continuously moving holders.

158. In a fruit packaging machine, the combination of a hollow movable former, means for wrapping a sheet about and over the end of the same and for pasting and drying the edges of said sheet, a plunger reciprocating in said former, said former having an opening for the entry of fruit in the former in advance of the plunger and means for operating the plunger to compress the fruit and to discharge the compressed fruit and wrapper, a support on which the filled wrapper is discharged, mechanism associated with the wrapper-former for closing the open end of the filled wrapper, and a pusher bar associated with the plunger to deliver the package from said support to said end-closing mechanism.

159. In a packaging machine for packaging sticky material, the combination with a hollow wrapper carrier adapted to carry the wrapper on its outside, means for charging the carrier with material to be packaged, and means to discharge the wrapper and the contents of the carrier, of means for closing the open end of the filled package comprising an endless carrier, holders on said carrier and folding and sealing devices in the path of the open end of the package on said carrier, said wrapper-carrier and said holders arranged horizontally with the open end of the package always at the side.

160. In a packaging machine, the combination with a hollow wrapper carrier adapted to carry the wrapper on its outside, means for charging the carrier with material to be packaged, and means to discharge the wrapper and the contents of the carrier, of means for closing the open end of the filled package comprising an endless carrier, holders on said carrier, folding and sealing devices in the path of the open end of the package on said carrier, and means for operating the carrier continuously.

161. In a packaging machine for packaging sticky material, the combination with a hollow wrapper carrier adapted to carry the wrapper on its outside, means for charging the carrier with material to be packaged, and means including a plunger to discharge the wrapper and the contents of the carrier simultaneously, of means for folding the open end of the filled package comprising a carrier, a package holder on said carrier, means for delivering the package into said holder, and folding and sealing devices operatively associated with the holder, said wrapper carrier and said holder arranged horizontally with the open end of the package always at the side.

162. In a packaging machine, the combination with a hollow wrapper carrier adapted to carry the wrapper on its outside, means for charging the carrier with material to be packaged, and means to discharge the wrapper and the contents of the carrier simultaneously, of means for folding the open end of the filled package comprising a carrier, a package holder on said carrier, means for delivering the package into said holder, folding and sealing devices operatively associated with the holder, and means for moving the carrier continuously.

163. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the filled package comprising a suitably supported holder for the package, means for moving the holder and its contents in vertical planes, and means disposed relative to the path of movement of the holder to close the unsealed end of the package.

164. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the filled package comprising a suitably supported holder for the package, means for moving the holder and its contents in vertical planes, means disposed relative to the path of movement of the holder to close the unsealed end of the package, and means for giving the holder a continuous movement.

165. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the package comprising a movable holder having a hinged lid, means for closing and opening the lid to receive and hold the package and means relative to the path of movement of the holder to close the unsealed end of the package.

166. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the package comprising a movable holder having a hinged lid, means for closing and opening the lid to receive and hold the package, means relative to the path of movement of the holder to close the unsealed end of the package and means for moving the holder continuously.

167. In a packaging machine, the combination of a hollow wrapper carrier, means for filling the wrapper while on the carrier, means for discharging the filled wrapper therefrom, and means for closing the open end of the filled package comprising a suitably supported movable holder into which the package is received in horizontal position, end folding mechanism associated with the holder, and means for maintaining the package in horizontal position during the folding operation.

168. In a packaging machine, the combination of a hollow wrapper carrier, means for filling the wrapper while on the carrier, means for discharging the filled wrapper therefrom, and means for closing the open end of the filled package comprising a suitably supported movable holder into which the package is received in horizontal position, end folding mechanism associated with the holder, means for maintaining the package in horizontal position during the folding operation and means for moving the holder continuously.

169. In a packaging machine for packaging sticky material, the combination with a hollow wrapper carrier adapted to carry the wrapper on its outside, means for charging the carrier with material to be packaged, and means including a plunger to discharge the wrapper and the contents of the carrier simultaneously, of means for closing the open end of a filled wrapper comprising a suitably supported holder into which the package is received in horizontal position, means for folding one edge of the unsealed end of the wrapper, means for folding simultaneously the two adjacent edges thereof and means for finally folding the remaining edge, said wrapper carrier and said holder arranged horizontally with the open end of the package always at the side.

170. In a packaging machine for packaging sticky material, the combination with a hollow wrapper carrier adapted to carry the wrapper on its outside, means for charging the carrier with material to be packaged, and means including a plunger to discharge the wrapper and the contents of the carrier simultaneously, of means for closing the open end of a filled wrapper comprising a suitably supported holder into which the package is received in horizontal position, means for folding one edge of the unsealed end of the wrapper, means for folding simultaneously the two adjacent edges thereof, means for finally folding the remaining edge and means for moving the holder during said folding operations, said wrapper carrier and said holder arranged horizontally with the open end of the package always at the side.

171. In a packaging machine for packaging sticky material, the combination with a hollow wrapper carrier adapted to carry the wrapper on its outside, means for charging the carrier with material to be packaged, and means including a plunger to discharge the wrapper and the contents of the carrier simultaneously, of means for closing the open end of the filled wrapper comprising a suitably supported movable holder, means associated with the holder to fold the top edge of the unfolded end of the wrapper, means to fold simultaneously the side edges thereof, and means finally to fold the remaining edge, said wrapper carrier and said holder arranged horizontally with the open end of the package always at the side.

172. In a packaging machine for packaging sticky material, the combination with a hollow wrapper carrier adapted to carry the wrapper on its outside, means for charging the carrier with material to be packaged, and means including a plunger to discharge the wrapper and the contents of the carrier simultaneously, of means for closing the open end of the filled wrapper comprising a suitably supported movable holder, means associated with the holder to fold the top edge of the unfolded end of the wrapper, means to fold simultaneously the side edges thereof, means to fold the remaining edge and means to move the holder during said folding operations, said wrapper carrier and said holder arranged horizontally with the open end of the package always at the side.

173. In a packaging machine, the combination with a hollow wrapper carrier adapted to carry the wrapper on its outside, means for charging the carrier with material to be packaged, and means to discharge the wrapper and the contents of the carrier simultaneously, of means to close the open end of the filled wrapper comprising a suitably supported rectangular movable holder having a hinged lid, means to hold said lid open during a portion of the movement of said holder, means to hold it closed during a portion of its movement, and means disposed relative to the path of movement of the holder to fold and seal the open end of the wrapper.

174. In a packaging machine, the combination with a hollow wrapper carrier adapted to carry the wrapper on its outside, means for charging the carrier with material to be packaged, and means to discharge the wrapper and the contents of the carrier simultaneously, of means to close the open end of the filled wrapper comprising a suitably supported rectangular movable holder having a hinged lid, means to hold said lid open during a portion of the movement of said holder, means to hold it closed during a portion of its movement, means disposed relative to the path of movement of the holder to fold and seal the open end of the wrapper, and means for moving the holder continuously.

175. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the filled wrapper comprising a suitably supported movable rectangular holder, said holder having means to clamp a contained package, end folding devices associated with the holder and means for giving the latter a continuous movement.

176. In a packaging machine, the combination of a hollow wrapper carrier, means for filling the wrapper while on the carrier, means for discharging the filled wrapper therefrom, and means for closing the open end of the filled wrapper, comprising an endless carrier, holders on said carrier, means for maintaining the packages in said holders in horizontal position, and end-folding and sealing devices associated with said carrier.

177. In a packaging machine, the combination of a hollow wrapper carrier, means for filling the wrapper while on the carrier, means for discharging the filled wrapper therefrom, and means for closing the open end of the filled wrapper, comprising an endless carrier, holders on said carrier, means for maintaining the packages in said holders in horizontal position, end-folding and sealing devices associated with said carrier, and means for giving the carrier a continuous movement.

178. In a packaging machine, the combination of a hollow wrapper carrier, means for filling the wrapper while on the carrier, means for discharging the filled wrapper therefrom, and means for closing the open end of the filled wrapper comprising an endless carrier, holders on said carrier into which the packages are adapted to be delivered in horizontal position, means for maintaining the packages while thereon in horizontal position and end-folding devices comprising a hinged rubber as 135, a creaser as 136, revoluble pressers 141, and a frictional surface as 148.

179. In a packaging machine, the combination of a hollow wrapper carrier, means for filling the wrapper while on the carrier, means for discharging the filled wrapper therefrom, and means for closing the open end of the filled wrapper comprising an endless carrier, holders on said carrier into which the packages are adapted to be delivered in horizontal position, means for maintaining the packages while thereon in horizontal position, end-folding devices comprising a hinged rubber as 135, a creaser as 136, revoluble pressers 141, a frictional surface as 148, and means for moving the carrier continuously.

180. In a packaging machine, the combination of a hollow wrapper carrier, means for filling the wrapper while on the carrier, means for discharging the filled wrapper therefrom, and means for closing the open end of the filled wrapper, comprising a carrier movable in vertical planes, holders on said carrier, said holders having hinged lids, means including rotatable segments for opening and closing said lids and end closure devices relative to the path of movement of the holder.

181. In a packaging machine, the combination of a hollow wrapper carrier, means for filling the wrapper while on the carrier, means for discharging the filled wrapper therefrom, and means for closing the open end of the filled wrapper, comprising a carrier movable in vertical planes, holders on said carrier, said holders having hinged lids, means including rotatable segments for opening and closing said lids, end closure devices relative to the path of movement of the holder, and means for moving the carrier continuously.

182. In a packaging machine, the combination of a hollow wrapper carrier, means for filling the wrapper while on the carrier, means for discharging the filled wrapper therefrom, and means for closing the open end of the filled wrapper comprising an endless carrier movable in vertical planes, holders on said carrier, end folding devices associated with the holders, means for maintaining the packages in the holders in horizontal position during the folding operations and means for automatically discharging the completed package from the holders.

183. In a packaging machine, the combination of a hollow wrapper carrier, means for filling the wrapper while on the carrier, means for discharging the filled wrapper therefrom, and means for closing the open end of the filled wrapper comprising an endless carrier movable in vertical planes, holders on said carrier, end folding devices associated with the holders, means for maintaining the packages in the holders in horizontal position during the folding operations, means for automatically discharging the completed package from the holders, and means for moving the carrier continuously.

184. In a packaging machine, the combination of a hollow wrapper carrier, means for filling the wrapper while on the carrier, means for discharging the filled wrapper therefrom, and means for closing the open end of the filled wrapper, comprising an endless carrier movable in vertical planes, holders supported on said carrier, said holders having hinged lids, means including segments having non-rotatable axes for opening and closing said lids and end-folding devices associated with said holders.

185. In a packaging machine, the combination of a hollow wrapper carrier, means for filling the wrapper while on the carrier, means for discharging the filled wrapper therefrom, and means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, and means for maintaining the holders and packages in horizontal position during the folding operations.

186. In a packaging machine, the combination of a hollow wrapper carrier, means for filling the wrapper while on the carrier, means for discharging the filled wrapper therefrom, and means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, means for maintaining the holders and packages in horizontal position during the folding operations, means for automatically discharging the completed package from the holders, and means for giving the carrier a continuous movement.

187. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the filled wrapper comprising an endless carrier, holders supported on said carrier, means for maintaining the holders in horizontal position during a portion of their movement, associated end-folding mechanism, said holders having lids coöperating with the bottom of the holders as clamps to hold a package in position, and means for opening and closing said lids.

188. In a packaging machine, the combination with a hollow wrapper carrier adapted to carry the wrapper on its outside, means for charging the carrier with material to be packaged, and means to discharge the wrapper and the contents of the carrier simultaneously, of means for closing the open end of the filled wrapper comprising an endless carrier, holders supported on said carrier, means for maintaining the holders in horizontal position during a portion of their movement, associated end-folding mechanism, said holders having lids coöperating with the bottom of the holders as clamps to hold a package in position, means for opening and closing said lids and means for moving the carrier continuously.

189. In a packaging machine, the combination of a hollow wrapper carrier, means for filling the wrapper while on the carrier, means for discharging the filled wrapper therefrom, and means for closing the open end of the filled wrapper, comprising an endless carrier movable in vertical planes, holders on said carrier, associated end-folding mechanisms, guide means to maintain the holders in substantially horizontal position during the folding operations and means to tip the holders and discharge them of their contents.

190. The combination with a movable hollow former, of a pivoted adjustable gripper having coöperating, spring-pressed members to engage a plurality of sides of said former and operatable by the movements of the former, means to move the former during said folding operation, means for completing the wrapper and means for filling the wrapper while on the former.

191. The combination with a movable hollow former, of a pivoted adjustable gripper disposed in the path of said former and having coöperating gripper members engaging the former to fold the sheet about a plurality of sides of the same, means to move the former during said folding operation, means for completing the wrapper and means for filling the wrapper while on the former.

192. The combination with a movable hollow former of a gripper in the path of the former having adjustable pivotally connected coöperating members to fold and clamp a sheet about the sides of the former, means to move the former during said folding operation, means for completing the wrapper and means for filling the wrapper while on the former.

193. The combination of a plurality of successively arranged movable formers, of means in the path of and actuated by said formers to fold a sheet about each former, said means including a rotatable support having radially disposed hinged adjustable grippers engaging successive formers, and means to move the formers during said folding operation.

194. The combination with a movable former, of means in the path of said former for folding a sheet about said former, said means including a rotatable support, adjustable grippers disposed radially of said support to engage the sides of said former, and means to move the former during said folding operation.

195. The combination with a continuously traveling hollow former, of means in the path of and actuated by said former to fold a container sheet about it, said means including a rotatable support having radially disposed hinged adjustable grippers adapted to embrace the former, and means to move the former during said folding operation.

196. The combination with a movable hollow former, of a pivoted adjustable gripper disposed in the path of said former and having coöperating gripper members engaging the former to fold the sheet about a plurality of sides of the same, means to move the former during said folding operation, and folding devices and means for filling the folded sheet while on the former.

197. In a packaging machine, the combination with wrapper carrying and filling devices, of means for closing the open end of the filled wrapper, comprising an endless carrier, holders on said carrier, means for maintaining the packages in said holders in horizontal position, and end-folding and sealing devices associated with said carrier.

198. In a packaging machine, the combination with wrapper carrying and filling devices, of means for closing the open end of the filled wrapper, comprising an endless carrier, holders on said carriers, means for maintaining the packages in said holders in horizontal position, end-folding and sealing devices associated with said carrier, and means for giving the carrier a continuous movement.

199. In a packaging machine, the combination with wrapper carrying and filling devices, of means for closing the open end of the filled wrapper, comprising an endless carrier, holders on said carrier into which the packages are adapted to be delivered in horizontal position, means for maintaining the packages while theren in horizontal position and end-folding devices comprising a hinged rubber as 135, a creaser as 136, revoluble pressers 141, and a frictional surface as 148.

200. In a packaging machine, the combination with wrapper carrying and filling devices, of means for closing the open end of the filled wrapper comprising an endless carrier, holders on said carrier into which the packages are adapted to be delivered in horizontal position, means for maintaining the packages while thereon in horizontal position, end-folding devices comprising a hinged rubber as 135, a creaser as 136, revoluble pressers 141, a frictional surface as 148, and means for moving the carrier continuously.

201. In a packaging machine, the combination with wrapper carrying and filling devices, of means for closing the open end of the filled wrapper, comprising a carrier movable in vertical planes, holders on said carrier, said holders having hinged lids, means including rotatable segments for opening and closing said lids and end closure devices relative to the path of movement of the holder.

202. In a packaging machine, the combination with wrapper carrying and filling devices, of means for closing the open end of the filled wrapper, comprising a carrier movable in vertical planes, holders on said carrier, said holders having hinged lids, means including rotatable segments for opening and closing said lids, end closure devices relative to the path of movement of the holder, and means for moving the carrier continuously.

203. In a packaging machine, the combination with wrapper carrying and filling devices, of means for closing the open end of the filled wrapper comprising an endless carrier movable in vertical planes, holders on said carrier, end folding devices associated with the holders, means for maintaining the packages in the holders in horizontal position during the folding operations and means for discharging the completed package from the holders.

204. In a packaging machine, the combination with wrapper-carrying and filling devices, of means for closing the open end of the filled wrapper comprising an endless carrier movable in vertical planes, holders on said carrier, end folding devices associated with the holders, means for maintaining the packages in the holders in horizontal position during the folding operations, means for discharging the completed package from the holders, and means for moving the carrier continuously.

205. In a packaging machine, the combination with wrapper-carrying and filling devices, of means for closing the open end of the filled wrapper, comprising an endless carrier movable in vertical planes, holders supported on said carrier, said holders having hinged lids, means including segments having non-rotatable axes for opening and closing said lids, and end-folding devices associated with said holders.

206. In a packaging machine, the combination with wrapper carrying and filling devices, of means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, and means for maintaining the holders and packages in horizontal position during the folding operations.

207. In a packaging machine, the combination with wrapper-carrying and filling devices, of means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, means for maintaining the holders and packages in horizontal position during the folding operations, means for discharging the completed package from the holders, and means for giving the carrier a continuous movement.

208. In a packaging machine, the combination of a wrapper carrier, means for filling the wrapper and means for moving the wrapper-carrier continuously, of means for closing the open end of the filled wrapper, comprising an endless carrier, holders on said carrier, means for maintaining the packages in said holders in horizontal position, and end-folding and sealing devices associated with said carrier.

209. In a packaging machine, the combination of a wrapper carrier, means for filling the wrapper and means for moving the wrapper-carrier continuously, of means for closing the open end of the filled wrapper, comprising an endless carrier, holders on said carrier, means for maintaining the packages in said holders in horizontal position, end-folding and sealing devices associated with said carrier, and means for giving the carrier a continuous movement.

210. In a packaging machine, the combination of a wrapper carrier, means for filling the wrapper and means for moving the wrapper-carrier continuously, of means for closing the open end of the filled wrapper comprising an endless carrier, holders on said carrier into which the packages are adapted to be delivered in horizontal position, means for maintaining the packages while thereon in horizontal position and end-folding devices comprising a hinged rubber as 135, a creaser as 136 revoluble pressers 141, and a frictional surface as 148.

211. In a packaging machine, the combination of a wrapper carrier, means for filling the wrapper and means for moving the wrapper-carrier continuously, of means for closing the open end of the filled wrapper comprising an endless carrier, holders on said carrier into which the packages are adapted to be delivered in horizontal position, means for maintaining the packages while thereon in horizontal position, end-folding devices comprising a hinged rubber as 135, a creaser as 136, revoluble pressers 141, a frictional surface as 148, and means for moving the carrier continuously.

212. In a packaging machine, the combination of a wrapper carrier, means for filling the wrapper and means for moving the wrapper-carrier continuously, of means for closing the open end of the filled wrapper, comprising a carrier movable in vertical planes, holders on said carrier, said holders having hinged lids, means including rotatable segments for opening and closing said lids and end closure devices relative to the path of movement of the holder.

213. In a packaging machine, the combination of a wrapper carrier, means for filling the wrapper and means for moving the wrapper-carrier continuously, of means for closing the open end of the filled wrapper, comprising a carrier movable in vertical planes, holders on said carrier, said holders having hinged lids, means including rotatable segments for opening and closing said lids, end closure devices relative to the path of movement of the holder, and means for moving the carrier continuously.

214. In a packaging machine, the combination of a wrapper carrier, means for filling the wrapper and means for moving the wrapper-carrier continuously, of means for closing the open end of the filled wrapper comprising an endless carrier movable in vertical planes, holders on said carrier, end folding devices associated with the holders, means for maintaining the packages in the holders in horizontal position during the folding operations and means for discharging the completed package from the holders.

215. In a packaging machine, the combination of a wrapper carrier, means for filling the wrapper and means for moving the wrapper-carrier continuously, of means for closing the open end of the filled wrapper comprising an endless carrier movable in vertical planes, holders on said carrier, end folding devices associated with the holders, means for maintaining the packages in the holders in horizontal position during the folding operations, means for discharging the completed package from the holders, and means for moving the carrier continuously.

216. In a packaging machine, the combination of a wrapper carrier, means for filling the wrapper and means for moving the wrapper-carrier continuously, of means for closing the open end of the filled wrapper, comprising an endless carrier movable in vertical planes, holders supported on said carrier, said holders having hinged lids, means including segments having non-rotatable axes for opening and closing said lids and end-folding devices associated with said holders.

217. In a packaging machine, the combination of a wrapper carrier, means for filling the wrapper and means for moving the wrapper-carrier continuously, of means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, and means for maintaining the holders and packages in horizontal position during the folding operations.

218. In a packaging machine, the combination of a wrapper carrier, means for filling the wrapper and means for moving the wrapper-carrier continuously, of means for closing the open end of the filled wrapper, comprising an endless carrier movable in vertical planes, holders supported on said carrier, said holders having hinged lids, means including segments having non-rotatable axes for opening and closing said lids, end-folding devices associated with said holders, means for maintaining the holders and packages in horizontal position during the folding operations, means for discharging the completed package from the holders, and means for giving the carrier a continuous movement.

219. In a packaging machine, the combination of a wrapper carrier, means for filling the wrapper and means for moving the wrapper-carrier continuously, of means for closing the open end of the filled wrapper comprising an endless carrier, holders supported on said carrier, means for maintaining the holders in horizontal position during a portion of their movement, associated end-folding mechanism, said holders having lids coöperating with the bottom of the holders as clamps to hold a package in position, and means for opening and closing said lids.

220. In a packaging machine, the combination of a wrapper-carrier, means for filling the wrapper and means for moving the wrapper-carrier continuously, of means for closing the open end of a filled wrapper comprising an endless carrier, holders supported on said carrier, means for maintaining the holders in horizontal position during a portion of their movement, associated end-folding mechanism, said holders having lids coöperating with the bottom of the holders as clamps to hold a package in position, automatic means for opening and closing said lids, and means for moving the carrier continuously.

221. In a packaging machine, the combination of a wrapper carrier, means for filling the wrapper and means for moving the wrapper-carrier continuously, of means for closing the open end of a filled wrapper, comprising an endless carrier movable in vertical planes, holders on said carrier, associated end-folding mechanisms, guide means to maintain the holders in substantially horizontal position during the folding operations and means to tip the holders and discharge them of their contents.

222. In a packaging machine, the combination of a carrier, hollow formers thereon, plungers movable in said formers, means for folding wrappers about the formers, means for delivering material to be packaged into the formers, means for discharging filled wrappers from the formers, means for closing the ends of the wrappers and means for moving the carrier continuously.

223. In a packaging machine, a traveling hollow former, a plunger therein, wrapper-folding devices associated with the former, means for charging the former with material to be packaged, means for operating the plungers to discharge the filled wrappers, and means for closing the ends of the wrapper.

224. In a packaging machine, a traveling hollow former, a plunger therein, wrapper-folding devices associated with the former, means for charging the former with material to be packaged, means for operating the plungers to discharge the filled wrappers, means for closing the ends of the wrapper and means for moving the former continuously.

225. In a packaging machine, a traveling hollow former, wrapper-folding devices associated with the former, means for charging the former with material to be packaged, means for compressing the contents of the former and for charging the wrappers direct from the formers and means for closing the open end of the filled wapper.

226. In a packaging machine, a traveling hollow former, wrapper-folding devices associated with the former, means for charging the former with material to be packaged, means for compressing the contents of the former and for charging the wrappers direct from the formers and means for closing the open end of the filled wrapper, and means to operate the hollow former continuously.

227. In a packaging machine, the combination with a traveling former of an oscillating part having a limited movement in unison with the former, folding devices carried by said oscillating part, said devices comprising a bell crank lever as 64 and a plate as 68 both movable across the end of the former and each adapted to fold a side of the projecting end of the wrapper sheet, means for giving said lever and plate a coordinate movement, and means for moving the former continuously.

228. In a packaging machine, the combination with a traveling former of an oscillating part having a pivotally supported roller arranged in the path of the former, a folding device carried by the oscillating part and arranged to operate across the end of the former to fold the top projecting edge of the sheet, an oscillating plate operating at right angles to said folding device across the end of the former, stop means in the path of the plate to effect its oscillation in one direction, means for locking the plate across the end of the former, means for releasing said plate on the disengagement of said roller from the former and means for moving the former continuously.

229. In a packaging machine, an end-folding mechanism comprising an oscillating arm 61, a bell crank lever 64, a plate 68, a wrapper carrier engageable with the arm to move it, a track-way 66 and hinged section 67 engaging by the bell crank lever and stops 72—77 engageable by parts rigid with plate 68.

230. In a packaging machine, the combination with a movable former of an oscillating arm movable in unison with the former, a bell crank lever operative across the end of the former and carried by the arm, a plate operating at right angles to the plane of movement of the bell crank lever and across the end of the former and carried by the arm, means for holding the plate and lever normally out of engagement with the former and means for effecting their movement, said means for moving the bell crank lever including a guide 66 and a hinge section 67.

231. In a packaging machine, the combination with a movable former of an oscillating arm movable in unison with the former, a bell crank lever operative across the end of the former and carried by the arm, a plate operating at right angles to the plane of movement of the bell crank lever and across the end of the former and carried by the arm, means for holding the plate and lever normally out of engagement with the former, and means for effecting their movement, said means for moving the plate including a hinged guide and stop 72 in the path of the part carried by the plate.

232. In a packaging machine, the combination with a movable hollow former of a plunger in the former, means for forming a wrapper about the sides and over one end of the former, said end-forming means including an oscillating arm movable in unison with the former, a bell crank lever operative across the end of the former and carried by the arm, a plate operating at right angles to the plane of movement of the bell crank lever and across the end of the former and carried by the arm, means for holding the plate and lever normally out of engagement with the former, means for effecting their movement, means for moving the former continuously and means to reciprocate said plunger.

233. In a packaging machine, the combination with a suitable frame-work of a movable hollow former, a plunger therein, means for folding a sheet about the former, means for folding the sheet over the end of the former, said last named means including an oscillating arm intermittently movable in unison with the former, folding devices carried by the arm and operating in planes at right angles to each other to fold two sides of the end of the sheet, means on the frame and contiguous to the path of movement of the former to fold the remaining sides of the end of the sheet, means to charge the former with material to be packaged and means to operate the plunger to discharge the wrapper and the contents of the former.

234. The combination with a traveling hollow wrapper carrier adapted to carry a wrapper on its outside, said wrapper carrier having a lateral feed-inlet, a plunger operative in the wrapper carrier across said inlet, means for charging the wrapper carrier with material to be packaged, means to move the carrier, and means to move the plunger to discharge the contents of the wrapper-carrier into the wrapper.

235. The combination with a traveling hollow open ended horizontally arranged wrapper carrier, adapted to carry on its outside a wrapper closed at one end, said wrapper-carrier having a side filling-opening, means for charging the wrapper carrier with material to be packaged, and means having a coördinate movement with the carrier operating through the medium of the material in the wrapper-carrier to discharge the wrapper.

236. The combination with a traveling hollow wrapper carrier having a lateral feed inlet and adapted to carry on its outside a wrapper closed at one end, means for charging the wrapper carrier with material to be packaged, means operating through the medium of the material in the wrapper-carrier to discharge the wrapper and means for moving the wrapper-carrier continuously.

237. The combination with a traveling hollow wrapper-carrier, adapted to carry on its outside a wrapper closed at one end, means for charging the wrapper-carrier with material to be packaged, means having a coördinate movement with the carrier operating through the medium of the material in the wrapper-carrier to discharge the wrapper, and means for moving the wrapper-carrier continuously.

238. The combination with a traveling hollow wrapper-carrier having a lateral feed inlet, adapted to carry on its outside a wrapper having one end closed, a plunger operating in the carrier, and means supporting the closed end of the wrapper in opposition to the movement of the plunger.

239. The combination with a traveling hollow, open-ended horizontally arranged wrapper carrier adapted to carry on its outside a wrapper having one end closed, said wrapper carrier having a side-filling opening, a plunger operating in the carrier, means supporting the closed end of the wrapper in opposition to the movement of the plunger, and means for giving the plunger a movement coördinate with the movement of the wrapper-carrier.

240. The combination with a traveling hollow wrapper-carrier, adapted to carry on its outside a wrapper having one end closed, a plunger operating in the carrier, means supporting the closed end of the wrapper in opposition to the movement of the plunger, and means for moving the carrier continuously.

241. The combination with a traveling hollow wrapper-carrier, adapted to carry on its outside a wrapper having one end closed, a plunger operating in the carrier, means supporting the closed end of the wrapper in opposition to the movement of the plunger, means for giving the plunger a movement coördinate with the movement of the wrapper-carrier, and means for moving the carrier continuously.

242. The combination with a hollow, open-ended, horizontally arranged wrapper carrier adapted to carry on its outside a wrapper having one end closed over the end of the wrapper-carrier, said wrapper-carrier having a side filling opening, a plunger therein, means to support the closed end of the wrapper against the operation of the plunger, means for charging the wrapper-carrier with material to be packaged, and means for operating the plunger coördinately with the charging means.

243. The combination with a traveling hollow wrapper-carrier adapted to carry on its outside a wrapper having one end closed over an end of the wrapper-carrier, a plunger therein, means to support the closed end of the wrapper against the operation of the plunger, means for charging the wrapper-carrier with material to be packaged, and means for operating the plunger coördinately with the charging means.

244. The combination with a traveling hollow wrapper-carrier adapted to carry on its outside a wrapper having one end closed over an end of the wrapper-carrier, a plunger therein, means to support the closed end of the wrapper against the operation of the plunger, means for charging the wrapper-carrier with material to be packaged, means for operating the plunger coördinately with the charging means, and means for moving the wrapper-carrier continuously.

245. The combination with a traveling hollow wrapper-carrier, adapted to carry on its outside a wrapper having a closed end, a plunger in said carrier, means for supporting the closed end of the wrapper in opposition to the plunger, means for charging the wrapper-carrier with material to be packaged, and means for moving the plunger.

246. The combination with a traveling hollow wrapper-carrier, adapted to carry on its outside a wrapper having a closed end, a plunger in said carrier, means for supporting the closed end of the wrapper in opposition to the plunger, means for charging the wrapper-carrier with material to be packaged, and means for moving the plunger coordinately with the movement of the carrier and of the charging means.

247. The combination with a traveling hollow wrapper-carrier, adapted to carry on its outside a wrapper having a closed end, a plunger in said carrier, means for supporting the closed end of the wrapper in opposition to the plunger, means for charging the wrapper-carrier with material to be packaged, means for moving the plunger, and means to move said carrier continuously.

248. In a packaging machine, the combination of an endless carrier, a hollow wrapper-former thereon, a plunger therein, means for forming a wrapper about said former, means for filling said former, and means for operating the plunger.

In testimony whereof I have hereunto set my hand in presence of two subscribing witnesses.

ANDREW W. LIVINGSTON.

Witnesses:
HENRY C. DROGER,
JAMES L. KING.